(12) United States Patent
Brinkhuis et al.

(10) Patent No.: US 9,181,452 B2
(45) Date of Patent: *Nov. 10, 2015

(54) CROSSLINKABLE COMPOSITION CROSSLINKABLE WITH A LATENT BASE CATALYST

(75) Inventors: Richard Hendrikus Gerrit Brinkhuis, Zwolle (NL); Jan Andre Jozef Schutyser, Dieren (NL); Paulus Jozef Dolphijn, Roosendaal (NL); Antonius Johannes Wilhelmus Buser, Wehl (NL); Petrus Johannes Maria David Elfrink, Boxmeer (NL); Michael Anthony Gessner, La Grange, KY (US); Mohamad Deeb Shalati, Louisville, KY (US)

(73) Assignee: NUPLEX RESINS B.V., Bergen Op Zoom (NL)

( * ) Notice: Subject to any disclaimer, the term of this patent is extended or adjusted under 35 U.S.C. 154(b) by 464 days.

This patent is subject to a terminal disclaimer.

(21) Appl. No.: 13/639,884

(22) PCT Filed: Apr. 7, 2011

(86) PCT No.: PCT/EP2011/055463
§ 371 (c)(1),
(2), (4) Date: Oct. 8, 2012

(87) PCT Pub. No.: WO2011/124663
PCT Pub. Date: Oct. 13, 2011

(65) Prior Publication Data
US 2013/0053505 A1 Feb. 28, 2013

(30) Foreign Application Priority Data
Apr. 7, 2010 (EP) .................................... 10159253

(51) Int. Cl.
C09D 167/02 (2006.01)
C08K 5/00 (2006.01)
C08K 5/098 (2006.01)

(52) U.S. Cl.
CPC .............. *C09D 167/02* (2013.01); *C08K 5/098* (2013.01)

(58) Field of Classification Search
CPC .......... C09D 167/02; B01J 31/02; C08K 5/00
USPC .......... 524/513, 539, 391, 130; 502/150, 164; 525/173
See application file for complete search history.

(56) References Cited

U.S. PATENT DOCUMENTS

| | | | |
|---|---|---|---|
| 2,635,100 A | 4/1953 | Werntz | |
| 2,759,913 A | 8/1956 | Hulse | |
| 4,217,396 A | 8/1980 | Heckles | |
| 4,408,018 A | 10/1983 | Bartman | |
| 4,602,061 A | 7/1986 | Akkerman | |
| 4,871,822 A | 10/1989 | Brindöpke et al. | |
| 5,959,028 A * | 9/1999 | Irie et al. .......................... | 525/10 |
| 5,990,224 A | 11/1999 | Raynolds et al. | |
| 6,201,048 B1 | 3/2001 | Raynolds et al. | |
| 6,262,169 B1 | 7/2001 | Helmer et al. | |
| 6,989,459 B2 | 1/2006 | Walker | |
| 2005/0143575 A1 | 6/2005 | Bernard | |
| 2007/0173602 A1 | 7/2007 | Brinkman et al. | |
| 2007/0299206 A1* | 12/2007 | Cooper et al. ................ | 525/54.1 |

FOREIGN PATENT DOCUMENTS

| | | |
|---|---|---|
| CN | 1309683 A | 8/2001 |
| CN | 1757656 A | 4/2006 |
| CN | 101012291 A1 | 8/2007 |
| DE | 835809 B | 4/1952 |
| EP | 0448154 A1 | 3/1991 |
| EP | 1593727 A1 | 11/2005 |
| EP | 1593727 B1 | 8/2008 |
| GB | 2405149 A1 | 8/2003 |
| JP | 10330690 A * | 12/1998 |
| TW | 200613500 A | 5/2006 |
| WO | 99/14278 A1 | 3/1999 |
| WO | 99/14279 A1 | 3/1999 |
| WO | 9914275 A1 | 3/1999 |
| WO | 9914278 A1 | 3/1999 |
| WO | 9914279 A1 | 3/1999 |
| WO | 9958608 A1 | 11/1999 |
| WO | 2008/070022 A1 | 6/2008 |

OTHER PUBLICATIONS

Arie Noomen, Progress in Organic Coatings, 32, 1997, 137-142.
T. Jung et al. Farbe and Lacke, Oct. 2003.
International Search Report for PCT/EP2011/055463 (Issued May 19, 2011).

* cited by examiner

*Primary Examiner* — Michael M Bernshteyn
(74) *Attorney, Agent, or Firm* — Hoyng Rokh Monegier LLP; Ramin Amirsehhi

(57) ABSTRACT

The present invention relates to a crosslinkable composition comprising at least one crosslinkable component and a latent base crosslinking catalyst, which crosslinkable composition has a solids content of typically at least 55 wt (dry weight after crosslinking relative to the total weight of the crosslinking composition) wherein the latent base catalyst is a substituted carbonate salt according to formula 1

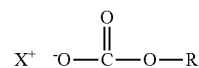

Formula 1 wherein $X^+$ represents a non acidic cation, preferably a quaternary ammonium or phosphonium, and wherein R is hydrogen, alkyl, aryl or aralkyl group.

24 Claims, No Drawings

CROSSLINKABLE COMPOSITION CROSSLINKABLE WITH A LATENT BASE CATALYST

CROSS REFERENCE TO RELATED APPLICATIONS

This application is a US National Stage under 35 USC 371 of international application number PCT/EP2011/055463 filed on Apr. 07, 2011 and claims priority from EP application number 10159253.3 filed on Apr. 07, 2010, the contents of both applications are hereby incorporated by reference in their entirety.

SUMMARY OF THE INVENTION

The present invention relates to a crosslinkable composition comprising at least one crosslinkable component and a latent base crosslinking catalyst, which crosslinkable composition has a solids content of at least 55 wt % (dry weight after crosslinking relative to the total weight of the crosslinking composition). The invention relates in particular to a composition crosslinkable by Real Michael Addition (RMA) reaction wherein a component with at least 2 activated unsaturated groups and a component with at least 2 acidic protons C—H in activated methylene or methine groups react and crosslink to each other in the presence of a strong base catalyst. The invention further relates to a coating composition comprising the crosslinkable composition according to the invention, a novel catalyst composition and to the use of said catalyst composition according to the invention as a latent base crosslinking catalyst in coating compositions, preferably in RMA crosslinkable compositions.

The crosslinkable composition is a 2-K system, which implies that the crosslinking catalyst is added to and mixed with the crosslinkable components shortly before use. From the moment of mixing, the crosslinking composition is potentially reactive and may start to crosslink. Such crosslinking compositions can be used only relatively shortly before the extent of viscosity build-up is such that the composition can no longer be used well. This effective use time is called the potlife. A latent crosslinking catalyst is used to increase this potlife, while allowing fast drying. A latent catalyst becomes active predominantly only when the composition is applied, for example as a coating. High solids systems are preferred or required by law to reduce environmental burden, and/or exposure of the painter to harmful solvent vapours.

A central challenge in developing coating systems, especially those that are cured at low to moderate temperatures, is achieving a good balance between on one hand rapid crosslinking during application (also referred to as "curing" or "drying") and on the other hand maintaining long pot lives, i.e. the ability to work with the paint without problems for a reasonable amount of time after preparation, at least an hour, but preferably much more. For high solids systems containing less solvent to evaporate upon application, this challenge is significantly greater than for low or medium solids systems containing more volatile solvent. Coatings for applications in decorative, vehicle refinish, metal, plastic, marine or protective coatings e.g. require several hours of potlife enabling the applicator to bring the paint composition on a substrate in a well-controlled manner. The viscosity and low solvent content requirements for high solids systems force the resin designer to select resins of lower molecular weight and/or lower glass transition temperatures that will require more reaction with a crosslinker to raise the Tg of the network to levels corresponding to a dry film, in the case of high solids paints. The lower amount of solvent used will create less "physical drying" effects of the film (physical hardening/reduced plastization due to the loss of solvent) than in paints using more volatile solvents, and also, the increase of the reaction rate going from paint to applied coating is less, because the increase of concentration of the reactive groups through the loss of solvent is less helpful. All these phenomena add to the problem that for high solids systems, a combination of fast drying and long pot life is very difficult to achieve, and much more so than in the case of medium or low solids systems.

PRIOR ART

The above described problem has been addressed by Noomen in Progress in Organic Coatings 32 (1997) 137-14 describing the use of latent base catalysed Michael addition as crosslinking reaction for high-solids polymer coating compositions of low VOC. Noomen describes several examples of crosslinking catalysts with the required basicity, for example the amidine types (such as tetra-methyl-guanidine) 1,5-diazabicyclo (4,3,0) non-5-ene (DBN), 1,8-diazabicyclo (5,4,0) undec-7-ene (DBN), tetra-butylammonium fluoride or in situ formed catalyst from a tertiary amine (like 1,4-diazabicyclo [2.2.2]octane: DABCO) with epoxy. Although such prior art catalysts might show quite acceptable curing behaviour in the RMA films, the short potlifes are too limited to get acceptable application times for rolling, brushing and spraying of the coatings, or the drying rate at lower curing temperatures is too low.

Noomen further describes that, although the film properties (such as durability when using malonate polyesters) looked promising, there were still severe shortcomings with this coating composition, in particular in the field of high solids coatings, because the curing under ambient and forced drying conditions revealed inhibition, speculatively assigned to the interaction of the carbon dioxide from the air with the strong base resulting in a tacky coating surface or inhibition by the interaction with the acidic groups of the substrate resulting in a low degree of cure or a minor adhesion. This was overcome by increasing the amount of catalyst but this resulted in a too short, unacceptable potlife, especially when using high solid formulations and in low temperature applications such as clear coats car refinishing, pigmented topcoats for marine, protective and aircraft, wood coatings, etc. Another problem was often the yellowing of the coating induced especially under stoving conditions.

EPO448154 (also from Noomen) describes to use certain carboxylic acids as a blocking agent for a strong basic catalyst. Although a longer potlife can be achieved, the basic catalyst with carboxylic acids as described in EP448514 provides an insufficient dust- and touch-drying behaviour and a low through-drying especially at ambient conditions. The prior art catalyst does not provide workable potlifes when inhibition problems are to be avoided and does not provide fast free-to-handle coatings, in particular for high solid coatings. Furthermore, deblocking of the catalyst blocked with e.g. carboxylic acids was only applicable at high temperatures.

Therefore there is still a need for crosslinkable compositions having a high solid content comprising crosslinkable components, preferably RMA crosslinkable polymers, and a latent base crosslinking catalyst that yield a good potlife/drying balance, in particular a workable potlife and a good drying behaviour also at lower temperatures in coating compositions.

There is also a desire for crosslinkable compositions comprising a catalyst that can be simply cured in ambient conditions as opposed to for example compositions comprising photo-latent amine catalysts, known from T. Jung et al Farbe and Lacke Oct 2003. Such photo-latent amine catalysts that do generate a strong base on UV radiation, are not suitable for coating more complex irregular substrates where parts of the surfaces are not reachable with UV or visible light.

According to the invention there is provided a crosslinkable composition comprising a crosslinkable component and a latent base crosslinking catalyst, which crosslinkable composition has a solids content of at least 55 wt % (dry weight after crosslinking relative to the total weight of the crosslinking composition) and wherein the latent base catalyst is a substituted carbonate salt according to formula 1

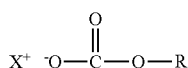

Formula 1 wherein X⁺ represents a (non-acidic) cation and wherein R is hydrogen, alkyl, aryl or aralkyl group. The R group can be unsubstituted or substituted, but if it is substituted then it should not comprise substituents that substantially interfere with the crosslinking reaction as is known and can be easily established by the skilled person. In particular, acidic substituents, for example carboxylic acids, are preferably present only in insubstantial amounts and are most preferably not included. This similarly applies to substituents on the crosslinkable component and to cation X.

The catalyst C is a latent base catalyst because on drying, the carbonate salt decomposes releasing carbon-dioxide to produce a strong base; either a hydroxide or an alkoxy, or aralkyloxy base. In a pot, in particular in a closed pot, the decomposition takes place only slowly, because the CO2 cannot escape to shift the reaction equilibria to completion, resulting in a good (long) pot life, whereas during drying of the crosslinkable composition when applied as a coating layer, the base is regenerated quickly resulting in good curing rate upon escape of the CO2 from the high surface area created. It was found that the crosslinkable composition has even at very high solids content a long workable potlife and a desirably fast drying and hardness build-up behaviour under most if not all curing conditions. Higher amounts of catalysts can be used without significantly affecting the potlife and so the crosslinkable composition can be used in pot-applications of the coating by brushing or rolling or spraying. An extra advantage is the absence of any yellowing even under high temperature stoving conditions.

We have surprisingly found that crosslinkable compositions comprising substituted carbonate salts as latent crosslinking catalysts give very good results in providing good balance of long pot-life in such high solids polymer coating compositions while at the same time having high curing rates during drying. Good results were obtained in crosslinkable compositions having a very high solid content, preferably at least 60, 65 or even more than 70 or more than 75 wt % (dry weight after crosslinking relative to the total weight of the crosslinking composition). It is noted that the solids content relates to the crosslinking composition not including particulate fillers or pigments that maybe added at a later stage for example when making a coating composition.

In a particularly preferred embodiment the crosslinkable composition comprises crosslinkable components comprising reactive components A and B each comprising at least 2 reactive groups wherein the at least 2 reactive groups of component A are acidic protons (C—H) in activated methylene or methine groups and the at least 2 reactive groups of component B are activated unsaturated groups (C═C), to achieve crosslinking by Real Michael Addition (RMA) reaction upon deblocking of the latent base catalyst C by evaporation of carbon dioxide. The components are molecules and the functional groups are the acidic protons C—H and unsaturated C═C groups in said molecule. The reactive functionality of a component is defined as the average number of functional groups per molecule of that component. In a system in which component A and B are separate molecules, at least one of components A or B comprises on average more than 2 reactive functional groups to achieve a crosslinked network. This does not apply if component A and B are combined in one molecule.

The one or more reactive components A and B and catalyst C are most conveniently present in the crosslinkable composition as separate molecules. Preferably, reactive components A and/or B are separate and each independently in the form of polymers, oligomers, dimers or monomers comprising at least 2 reactive groups. For example, Component A can be a malonate means that component A comprises one or more malonate groups, for example in a polymer. For coating applications, at least one of component A or B preferably are oligomers or polymers.

The reactive components A and B can also be combined in one A-B type molecule. In this embodiment of the crosslinkable composition both C—H and C═C reactive groups are present in one A-B molecule. It is envisaged that also Catalyst C can be combined in one molecule with component A and/or B, preferably as a combination of AC or BC. However, catalyst C most preferably is a separate component as it is preferred to mix the catalyst just before use to a composition comprising component A and B.

Component A: Activated Methylene or Methine (CH) Group-Containing Components

Suitable components A preferably comprise an activated C—H derivative having a structure according to formula 2:

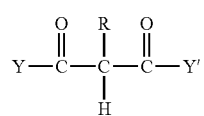

Formula 2 wherein R is hydrogen or an alkyl or aryl and Y and Y' are identical or different substituent groups, preferably alkyl, aralkyl or aryl (R*), or alkoxy (—OR*) or wherein in formula 2 the —C(═O)—Y and/or —C(═O)—Y' is replaced by CN or aryl, preferably no more than one phenyl. Y or Y' can be amide, but preferably not both. Most preferred is that A comprises malonate (Y and Y' are —OR*) or acetoacetate (Y is —OR* and Y' is —R*), preferably a malonate containing polymer, preferably a polyester, polyurethane, acrylic or polycarbonate. Also mixtures or hybrids of these polymer types are possible, In a most preferred embodiment of the crosslinkable composition, component A is a malonate containing compound. It is preferred that in the crosslinkable composition the majority of the activated C—H groups are from malonate, that is more than 50%, preferably more than 60%, more preferably more than 70%, most preferably more than 80% of all activated C—H groups in the crosslinkable composition are from malonate. In another embodiment, the crosslinking composition comprises a component A, for example a polymer, wherein more than 50%, preferably more than 70%, more preferably more than 80% and most preferably more than 90% of the activated C—H groups are from malonate and a separate component, for example another polymer, oligomer or monomer, comprising activated C—H groups not from malonate.

The advantages of the invention are particularly manifest in critically difficult compositions comprising not only a high solids content but also aimed at a high crosslinking density, with relative high concentrations and functionalities of functional groups, for example in case the component A is a compound, in particular an oligomer or polymer, comprising an average of 2 to 30, preferably 4 to 20 and more preferably 4-10 activate C—H per polymer chain. The substituent R or R* groups can be unsubstituted or substituted, but as described above if it is substituted than evidently it should not comprise substituents that substantially interfere with the crosslinking reaction.

Examples of suitable components containing activated methylene or methine groups are generally disclosed in U.S. Pat. No. 4,871,822 (see especially column 4, lines 15-28), which components contain a methylene and/or monosubstituted methylene group in the alpha-position to two activating groups such as, for example, carbonyl, cyano, sulfoxide and/or nitro groups. Preferred are components containing a methylene group in the alpha-position to two carbonyl groups, such as malonate and/or acetoacetate group-containing components, malonates being most preferred.

Suitable examples of malonate group-containing components may be mentioned malonic acid esters as disclosed in U.S. Pat. No. 2,759,913 (column 8, lines 51-52), and malonate group-containing oligomeric and polymeric components as disclosed in U.S. Pat. No. 4,602,061 (column 1, line 10 through column 2, line 13). Preferred are the oligomeric and/or polymeric malonate group-containing components such as, for example, polyesters, polyurethanes, polyacrylates, epoxy resins, polyamides and polyvinyl resins containing malonate groups in the main chain, pendant or both.

The malonate group-containing polyesters can be obtained preferably by the transesterification of a methyl or ethyl diester of malonic acid, with multifunctional alcohols that can be of a polymeric or oligomeric nature. Malonate group-containing polyurethanes can be obtained, by reacting a polyisocyanate with a hydroxyl group-containing ester of a polyol and malonic acid, or e.g. by transesterification of an hydroxy functional polyurethane with a dialkylmalonate. Malonate group-containing epoxy esters can be obtained by esterifying an epoxy resin with malonic acid or a malonic monoester, or acid functional malonate polyester, or by transesterification with a dialkyl malonate, optionally with other carboxylic acids and derivatives thereof. Malonate group-containing polyamides, or polyamide-esters, can be obtained in the same manner as the polyesters, wherein at least a part of the hydroxy component is replaced with a mono- and/or polyfunctional primary and/or secondary amine. The malonate group-containing polyamides with malonamide functionality are less preferred. Other malonate group-containing polymers may be obtained by the transesterification of an excess of a dialkyl malonate with hydroxy-functional acrylic polymer. In this manner, a polymer with malonate group-containing side-chains may be formed. Any excess dialkyl malonate may be removed under reduced pressure or, optionally, be used as a reactive solvent.

Especially preferred malonate group-containing components for use with the present invention are the malonate group-containing oligomeric or polymeric esters, ethers, urethanes and epoxy esters containing 1-50, more preferably 2-10, malonate groups per molecule. In practice polyesters and polyurethanes are preferred. It is also preferred that such malonate group-containing components have a number average molecular weight (Mn) in the range of from about 100 to about 5000, more preferably, 250-2500, and an acid number of about 2 or less. Also monomalonates can be used as they have 2 reactive C—H per molecule. Monomeric malonates can, in addition, be used as reactive diluents.

Suitable acetoacetate group-containing components are acetoacetic esters as disclosed in U.S. Pat. No. 2,759,913 (column 8, lines 53-54), diacetoacetate components as disclosed in U.S. Pat. No. 4,217,396 (column 2, line 65 through column 3, line 27), and acetoacetate group-containing oligomeric and polymeric components as disclosed in U.S. Pat. No. 4,408,018 (column 1, line 51 through column 2, line 6). Preferred are the oligomeric and/or polymeric acetoacetate group-containing components.

Suitable acetoacetate group-containing oligomeric and polymeric components can be obtained, for example, from polyalcohols and/or hydroxy-functional polyether, polyester, polyacrylate, vinyl and epoxy oligomers and polymers by reaction with diketene or transesterification with an alkyl acetoacetate. Such components may also be obtained by copolymerization of an acetoacetate functional (meth)acrylic monomer with other vinyl- and/or acrylic-functional monomers.

Especially preferred of the acetoacetate group-containing components for use with the present invention are the acetoacetate group-containing oligomers and polymers containing at least 1, preferably 2-10, acetoacetate groups. It is also especially preferred that such acetoacetate group-containing components should have an Mn in the range of from about 100 to about 5000, and an acid number of about 2 or less.

Components containing both malonate and acetoacetate groups in the same molecule are also suitable. Additionally, physical mixtures of malonate and acetoacetate group-containing components are suitable. Alkylacetoacetates can, in addition, be used as reactive diluents.

Again as exemplified by the previously incorporated references, these and other malonate and/or acetoacetate group-containing components that can be used in the composition, and their methods of production, are generally known to those skilled in the art, and need no further explanation here.

Component B: Activated Unsaturated Group-Containing Components

Suitable components B generally can be ethylenically unsaturated components in which the carbon-carbon double bond is activated by an electron-withdrawing group, e.g. a carbonyl group in the alpha-position. Representative examples of such components are disclosed in U.S. Pat. No. 2,759,913 (column 6, line 35 through column 7, line 45), DE-PS-835809 (column 3, lines 16-41), U.S. Pat. No. 4,871,822 (column 2, line 14 through column 4, line 14), U.S. Pat. No. 4,602,061 (column 3, line 14 through column 4, line 14), U.S. Pat. No. 4,408,018 (column 2, lines 19-68) and U.S. Pat. No. 4,217,396 (column 1, line 60 through column 2, line 64). Acrylates, fumarates and maleates are preferred. Most preferably, the component B is an unsaturated acryloyl functional component, A first preferred group of suitable components B are the acrylic esters of components containing 2-6 hydroxyl groups and 1-20 carbon atoms. These esters may optionally contain hydroxyl groups. Especially preferred examples include hexanediol diacrylate, trimethylol propane triacrylate, pentaerythritol triacrylate, di-trimethylolpropane tetraacrylate. Apart from acryloyl esters a class of suitable components B are acrylamides.

As a second preferred example may be mentioned polyesters based upon maleic, fumaric and/or itaconic acid (and maleic and itaconic anhydride), and di- or polyvalent hydroxyl components, optionally including a monovalent hydroxyl and/or carboxyl component.

As a third preferred example may be mentioned resins as polyesters, polyurethanes, polyethers and/or alkyd resins containing pendant activated unsaturated groups. These include, for example, urethane acrylates obtained by reaction of a polyisocyanate with an hydroxyl group-containing acrylic ester, e.g., an hydroxyalkyl ester of acrylic acid or a component prepared by esterification of a polyhydroxyl component with less than a stoichiometric amount of acrylic acid; polyether acrylates obtained by esterification of an hydroxyl group-containing polyether with acrylic acid; polyfunctional acrylates obtained by reaction of an hydroxyalkyl acrylate with a polycarboxylic acid and/or a polyamino resin; polyacrylates obtained by reaction of acrylic acid with an epoxy resin; and polyalkylmaleates obtained by reaction of a monoalkylmaleate ester with an epoxy resin and/or an hydroxy functional oligomer or polymer.

Most preferred activated unsaturated group-containing components B are the unsaturated acryloyl functional components. It is also especially preferred that the acid value of the activated unsaturated group-containing components is sufficiently low to not substantially impair activity of the catalyst, so preferably less than about 2, most preferably less than 1 mg KOH/g. As exemplified by the previously incorporated references, these and other activated unsaturated group-containing components, and their methods of production, are generally known to those skilled in the art, and need no further explanation here. Preferably the functionality is 2-20, the equivalent weight (EQW: average molecular weight per reactive functional group) is 100-2000, and the number average molecular weight preferably is Mn 200-5000.

Component C: the Latent Base Catalyst

The latent base catalyst generally is a substituted carbonate salt according to formula 1

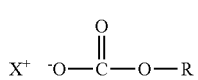

Formula 1 wherein $X^+$ represents a cation and wherein R is hydrogen, alkyl or aralkyl group. The cation must be non-acidic such that it does not interfere with the base catalyst and can for example be alkali-or earth-alkali metal, in particular lithium, sodium or potassium, but preferably is a quaternary ammonium or phosphonium ion according to formula 3,

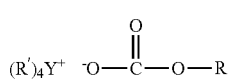

Formula 3 wherein Y represents N or P, and wherein each R' can be a same or different alkyl, aryl or aralkyl group, R can be hydrogen, alkyl, aryl or aralkyl group, wherein R and R' can be bridged to form a ring structure or R and/or R' can be a polymer. As described above, R and R' can be substituted with substituents that do not or not substantially interfere with the RMA crosslinking chemistry as is known to the skilled person. Preferably, R is an alkyl or aralkyl group most preferably R is an alkyl having 1 to 4 carbon atoms. These simple alkyl carbonates can be prepared easily by reaction of corresponding hydroxides with dialkylcarbonates or by the reaction of tertiary amines with dialkylcarbonates in alcohols.

The carbonate group and the cation can be linked in one molecule, for example the latent crosslinking catalyst is a substituted carbonate salt according to formula 4

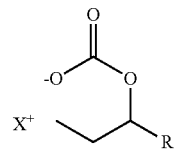

Formula 4

In another embodiment, the group R in the latent crosslinking catalyst is a polymer and/or X is a quaternary ammonium or phosphonium wherein one R' group is a polymer. Such a catalyst is obtainable by quaternising a polymer, preferably a polyacrylate, comprising a pending tertiary amine, preferably 2-(dimethylamino)ethylmethacrylate, with a dialkylcarbonate to form a quaternary ammonium carbonate according to formula 1, 3 or 4.

Quaternary ammonium compound components, such as didecyl-dimethylammoniumcarbonate and didecyl-dimethyl ammoniumchloride, are well known and used for its antimicrobial activity and wood preservation. The preparation of the quaternary ammonium carbonates is well known in the art. U.S. Pat. No. 6,989,459 and U.S. Pat. No. 452,635,100, describe a process for an in situ method of preparing quaternary ammonium methylcarbonate salts and quaternary ammonium alkylcarbonate salts in high yield from tertiary amines, methanol, and at least one of a cyclic carbonate, an aliphatic polyester, and an ester, and their subsequent conversion to quaternary ammonium bicarbonates, quaternary ammonium carbonates or both in a one-pot reaction.

Quaternisation of trialkylamine with dialkylcarbonate or cyclic carbonate leads at a high temperature under autogeneous conditions to components of formula 1. Polymers containing tertiary amine groups can also be quaternized with e.g. dimethylcarbonate to a quaternized polymeric ammonium methylcarbonate salt. Using 2-(dimethylamino)ethylmethacrylate (MADAM) as sole monomer or as comonomer in polyacrylates offers a means to get polymers containing tertiary amines suitable for quaternisation with dimethylcarbonate. Many others are possible such as epoxy containing resins modified with secondary amines or isocyanate containing products treated with e.g. 2-dimethylaminoethanol. The described prior art processes and a novel process are herewith incorporated by reference.

A preferred way to synthesize the catalyst is by reaction of the quaternary ammonium hydroxide with dialkylcarbonate to form a catalyst according to formula 1 or 3 or cyclic carbonate according to formula 4. This is done at room temperature by mixing some molar excess of liquid carbonate with a solution of the ammonium base. The blocking (conversion of hydroxide to alkylcarbonate) can be shown by means of titration with aqueous HCl titration: for the blocked catalyst an equivalence point at a lower pH is found. The scheme below illustrates for one embodiment of the invention the synthesis of a blocked catalyst and its decomposition to an alkoxide base. When applied in an RMA binder composition, the alkoxide abstracts a proton from the activated methylene or methine which, as a nucleophilic anion, subsequently adds on the double bond of the activated unsaturated group and abstracts a proton from another acidic methylene to initiate the next reaction.

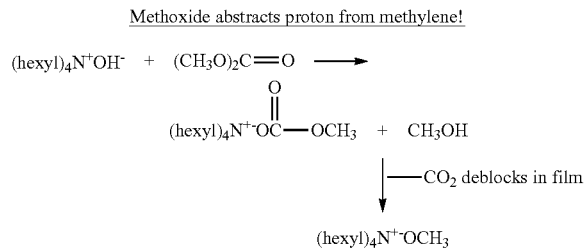

Methoxide abstracts proton from methylene!

It has been found that the potlife (defined as the time required to a doubling of the viscosity) or the gel-time (i.e. time to get a non-fluid formulation) is longer when the quaternary ammonium alkylcarbonates of formula 1 have two, preferably three of the four R radicals independently each more than 4 carbons but at most 18 carbons and the remaining R at least 2 carbons Good results can generally be obtained if the R groups on the quaternary cation comprise 4-18 carbon atoms. Surprisingly good results were also obtained with longer alkyl groups wherein the cation comprises at least two, preferably three or, more preferably, all four R' groups between 5 and 18 carbon atoms and the remaining R' groups comprise 1-18 carbon atoms. Tetrahexylammonium methylcarbonate, tetradecyl-(i.e. C-14)-trihexy-lammonium-methylcarbonate and tetradecylammonium methyl-carbonate for instance yielded longer potlifes than tetrabutylammonium methylcarbonate, benzyltrimethylammonium methylcarbonate, or trihexylmethylammonium methylcarbonate or trioctylmethylammonium methylcarbonate. These organic groups on the quaternary ammonium or phosphonium cation provide good compatibility of the catalyst with the polymer binder and organic solvents as well as good potlife.

Good results were obtained with tetrahexylammonium bicarbonate. It was found that tetrahexylammonium bicarbonate shows a potlife/drying balance being comparable with tetrahexylammonium methylcarbonate but better than tetrabutylammonium methylcarbonate and much better than tetrabutylammonium bicarbonate. So, the bulky substituents on the nitrogen are more important in determining the potlife than the type of carbonate. Experimental work of the inventors has shown that very good potlife/drying behavior and resin compatibility was obtained with tetrabutylammonium methylcarbonate catalyzed RMA and certainly with alkyl ammonium methylcarbonate with more bulky alkyl groups. Good potlifes could also be obtained when at least 1 R radical in formula 1 is a polymer such as MADAM containing polyacrylates quaternised with dimethylcarbonate.

The Crosslinkable Composition:

The present invention relates in particular to a crosslinkable composition comprising the above-mentioned components A, B and C. The crosslinkable compositions in accordance with the present invention are in general suitable for a variety of applications, such as coatings, adhesives, inks, film forming material, composites, moulding material etc. The most important application is in coating compositions, for example, as paint, impregnating, sealing and bonding compositions, especially for protective coatings for metals, plastics, wood and other well-known substrates. These coating compositions possess extended potlife, very good curing rates, and a good balance of physical and mechanical properties making them especially well suited for the aforementioned uses.

In the crosslinkable position, it is preferred that the ratio of the number of activated acidic protons CH in component A to the number of activated unsaturated groups (C=C) in component B (the CH/C=C ratio) is in the range between 10 and 0.1, more preferably between 5 and 0.2, even more preferably between 2 and 0.5, most preferably between 1.5 and 0.8. As mentioned earlier, the described components A and B react with each other through a Michael addition, in which the activated CH group of component B, when deprotonated, adds to one of the carbon atoms of the activated unsaturated group of component A. Hereby, the activated methylene can in principle be equivalent with 2 activated methine (CH) groups. This is only the case for those A/B combinations wherein both protons are reactive; for example in case of a system comprising acryloyl/malonate reactive groups 2 protons of the malonate group can react. For curing with maleates, this is not the case; the second C—H is no longer reactive once one maleate has been added.

Further, it is preferred that the latent crosslinking catalyst is utilized in an amount ranging between 0.001 and 0.3 meq/g solids, preferably between 0.01 and 0.2 meq/g solids, more preferably between 0.02 and 0.1 meq/g solids (meq/g solids defined as mmoles latent base relative to the total dry weight of the crosslinkable composition, not counting particulate fillers or pigments).

In a most preferred embodiment the crosslinkable composition comprises components A, B and C as described, wherein component A is a malonate (Y and Y' are —OR in formula 2). It was surprisingly found that significantly better potlife could be achieved in a composition wherein component A is a malonate (Y and Y' are —OR in formula 2), which composition further comprises 0.1 - 10 wt %, preferably 0.1 - 5, more preferably 0.2 - 3 most preferably 0.5 - 1.5 and most preferably 0.5 - 2 wt% water (relative to total weight of the coating composition). Preferably, the amount of water is chosen in an effective amount to increase gel time with at least 15 minutes, preferably at least 30 min, more preferably at least 1 h, even more preferably at least 5h, and most preferably at least 24h, 48 h. or at least 10%, 50% or 100% compared to the same composition without water. It is highly surprising that such improvement can be obtained by such small amounts of water. It is highly surprising that such improvement can be obtained by such small amounts of water.

Preferably, the composition further comprises an alcohol R"-OH wherein R" is a substituted or unsubstituted alkyl, (or aralkyl) which is same or different from the R of the carbonate. Preferably, the catalyst is added in such alcohol solvent to the other components of the crosslinkable composition, or the alcohol is present or added to the crosslinking components.

An improvement of the shelf life of the catalyst solution used can be obtained if the catalyst further comprises a compound RO—C(=O)O—R wherein R is preferably the same as R of the catalyst in formula 1, 3 or 4, where preferably the molar ratio of II to the mole of carbonate in the catalyst is 0.01-50, wherein water and component II are present in an amount of more than 1 mole % with respect to the catalyst. It is believed that the presence of the compound RO—C(=O)O—R in the crosslinkable composition allows regeneration of the blocked catalyst when premature $CO_2$ loss occurs.

It was found that the open time can be improved when a crosslinkable composition comprising components A and B as described above comprises in addition to component A, preferably a malonate, a second component A2 also comprising reactive acidic protons but having a higher acidity than component A and which preferably also is reactive towards component B. It was found that this generally applies to crosslinkable compositions comprising component A and component B irrespective of the nature of the latent base catalyst used. In a further improved embodiment the crosslinkable composition of the present invention also comprises in addition to component A, preferably a malonate, a second component A2 also comprising reactive acidic protons but having a higher acidity than component A and which also is reactive towards component B.

Preferably, the crosslinkable composition comprises, in addition to component A, a second C—H acidic component A2 with a higher acidity than that on component A that is also reactive towards component B with an RMA reaction. The component A2 can optionally also be bonded to component A in one molecule. It was surprisingly found that such crosslinkable compositions result in coatings having a faster hardness build-up, less solvent inclusion and improved appearance, in particular less skin formation and wrinkling during curing. This can also extend the pot life in some formulations. The aforementioned advantages of the presence of a second more acidic C—H acidic component A2 can also be obtained in RMA systems with catalyst systems other than the latent base catalysts according to the invention, for example in combination with the latent base catalyst described in the prior art described above, in particular also by Noomen. All these benefits are obtained while sacrificing only a limited time in surface drying, that is extremely fast anyway in particular for the RMA compositions of this invention.

Without wishing to be bound by theory, it is believed that the proton abstraction from the acidic methylene or methine groups on RMA component A does not take place substantially until the protons from the second RMA component A2 are used up, which goes very slow in the pot and quicker upon activation of the catalyst in the drying and curing film. The reactivity of anions of the component A2 is believed to be less than that of anions of component A. Once C—H's of the moderator components A2 have reacted with component B, the main component A will be deprotonated and start reaction with component B and crosslinking and hardening starts and proceeds quickly, substantially uninfluenced by the initial presence of component A2, just postponed by a tunable inhibition time. All base from the catalyst becomes available again on complete drying for deprotonating the component A.

Preferably, in this embodiment A is malonate and A2 is a component according to formula 2 having higher acidity by choice of a different R and/or of a different Y and/or Y'. The difference in acidity of the two C—H acidic components A and A2 is chosen preferably in that wherein the pKa of component A2 is between 0.5 and 6, preferably between 1 and 5 and more preferably between 1.5 and 4 units lower than the pKa of component A. Preferably, component A is a malonate containing component and component A2 is an acetoacetate or acetylacetone containing component.

Generally good results can be obtained when the amount of activated methine or methylene functional groups having the lower pKa (A2) is between 0.1 and 50 mole %, preferably between 1 and 35 mole %, preferably between 1 and 40 mole %, more preferably between 2 and 30 mole %. and more preferably between 2 and 20 mole % (of the total mole of activated methine or methylene functional groups) and in particular when the C—H functionality of component A2 is lower than the C—H functionality of A, preferably the C—H functionality of A2 is 1-10, 2-6, 2-4 or 2-3 wherein the functionality is average number of active C—H per molecule.

Most preferably, the components A and A2 are present as a mixture of polymeric component (A1) comprising malonate groups and a polymeric component (A2) comprising acetoacetate and/or acetylacetone groups. This improvement is particularly useful in compositions for high hardness coatings (high Tg, crosslink density).

Depending on the choice of the crosslinkable components, in particular components A and B in the RMA system, the crosslinkable composition can have a certain amount of an organic solvent or can have no solvent at all. However, the inventors found that particular and unexpected advantage in open time and hardness development can be achieved if in the crosslinkable composition at least part of the solvent is an alcohol solvent. The solvent can be a mixture of a non-alcoholic solvent and an alcohol solvent. Preferably, the alcohol is present in an amount of at least 1, preferably 1.5, preferably 2, more preferably 3, most preferably at least 5, even more preferably at least 10 wt % relative to the total weight of the crosslinkable composition and in view of VOC constraints preferably at most 45, preferably at most 40 wt % and preferably at most 50% (wt % relative to the total weight of the crosslinking composition).

The alcohol solvent preferably is one or more primary alcohols, more preferably a mono-alcohol having 1 to 20, preferably 1-10, more preferably 1-6 carbon atoms, preferably selected from the group of ethanol, n-propanol, n-butanol, n-amyl alcohol and butylglycol. For these preferred compositions it was surprisingly found that due to the presence of the alcohol solvent the viscosity of the composition in a closed container remains very low even after extended periods of time, while maintaining fast drying characteristics The absolute value of the viscosity depends on the application viscosity chosen. It is however important that the viscosity does not increase rapidly. Preferably the viscosity of the composition after addition of the catalyst does not increase more than a factor 2 within 4 hours, preferably 6 hours, more preferably 8 hours and most preferably 12 hours in a closed container at room temperature. Methanol is less preferred because of the health, environmental and safety risks.

The many advantages of the invention of a longer potlife and improved open time in the various embodiments as described above can also be obtained in coating compositions having solid contents lower than 55 wt %. In particular the invention also relates to a crosslinkable composition comprising reactive components A and B each comprising at least 2 reactive groups wherein the at least 2 reactive groups of component A are acidic protons (C—H) in activated methylene or methine groups and the at least 2 reactive groups of component B are activated unsaturated groups (C=C) to achieve crosslinking by Real Michael Addition (RMA) wherein the component A is a malonate containing component and wherein components A and B react upon deblocking of latent base catalyst C by evaporation of carbon dioxide, which latent base crosslinking catalyst is a substituted carbonate salt according to formula 1.

In summary, the most preferred embodiment is a crosslinkable composition comprising
a) a malonate containing compound as component A,
b) an unsaturated acryloyl functional compound as component B,
c) optionally component A2 comprising acetoacetate or acetylacetone groups having 0.1-50 mole % activated C—H on total activated C—H in methine or methylene functional groups in components A and A2), wherein the ratio of the number of activated acidic protons in component A+A2 to the number of activated unsaturated groups on component B is in the range between 0.5 and 2.0, d) which crosslinkable composition preferably has a solids content of at least 55 wt % (dry weight after crosslinking relative to the total weight of the crosslinking composition), e) 0.001-0.3 meq/g solids (mole carbonate relative to the total dry weight of the crosslinkable composition) of latent base crosslinking catalyst C being a substituted carbonate salt according to formula 1

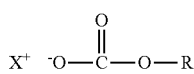

Formula 1 wherein X represents a non-acidic cation and wherein R is hydrogen, an alkyl, or aralkyl group, f) optionally 0.1-5 wt % water (relative to total weight of the coating composition), g) optionally an alcohol comprising solvent.

The coating composition:

The invention further relates to a coating composition comprising the crosslinkable composition according to the invention as a binder and optional usual coating additives. The coating composition preferably has a solids content of between 55 and 100% and 0 to 45 wt% solvent and a dry to touch time at room temperature between 5 to 120 min, preferably 5 to 60 min. and a gel time of at least 3 hours, preferably at least 6 hours, most preferable at least 9 hours at room temperature. The coating composition has low VOC and excellent properties, in particular good potlife / drying balance as described above. Such coating compositions preferably are free of inhibition, are free-to-handle within 8 hrs and exhibit a sufficient degree of curing within 7 days, detailed demands depending on the exact application.

Depending upon the field of application, the coating compositions in accordance with the present invention may optionally contain one or more pigments, dyes and usual intermediary agents, additives and/or solvents. Examples of suitable inert organic solvents include esters, ketones, ethers, alcohols, aromatic and aliphatic hydrocarbons. Examples of suitable reactive organic solvents include dimethyl malonate, diethyl malonate, ethyl acetoacetate and 2-ethylhexyl acrylate (mono-acrylates should be counted as compound B in terms of total functionality and because they are chain stoppers should not be present in too high amounts).

As examples of preferred additives may be mentioned minor amounts of a co-binder not containing activated unsaturated or CH acidic groups, for example, cellulose acetate butyrate, acrylic, epoxy and polyester resins. As is known to one skilled in the art, these co-binders are commonly utilized in the coatings industry to modify certain properties such as drying speed and adhesion to substrates.

As mentioned earlier, the coating compositions in accordance with the present invention are suitable for a variety of coatings uses, for example, as paint, impregnating, sealing and bonding compositions. A preferred application is as a primer, topcoat, or clearcoat; the coating compositions may be applied to a substrate in any convenient manner such as, for example, by brushing, spraying or dipping. Suitable substrates include metals, wood, board, plastics and leather.

The curing of the above-described coating composition is preferably carried out at elevated temperatures above about 0° C. generally between about 5° C. and about 150° C. Preferred coating compositions based on RMA crosslinkable composition comprising components A, B and C as described are preferably cured at curing temperature is between 0 and 80° C., preferably 5 to 60° C., most preferably between 5 and 30° C.

The invention further relates to a catalyst composition for use as a latent base crosslinking catalyst in a crosslinkable composition, preferably according to the above described invention comprising a. a substituted carbonate salt catalyst according to formula 1

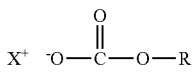

Formula 1 wherein $X^+$ represents a non-acidic cation and wherein R is hydrogen, alkyl, aryl or aralkyl group, in an amount of at least 0.01, preferably at least 0.2, more preferably at least 0.4 meq/gr cat composition, further comprising one or more of the features b) to e);

b. wherein the catalyst is a substituted carbonate salt according to formula 4, c. wherein R in formula 1 or 3 is an alkyl, aryl or aralkyl group, d. further comprising an additional compound II with the formula RO—C(=O)O—R wherein R is alkyl, aryl or aralkyl group and wherein the molar ratio of compound II to the mole of substituted carbonate salt in the latent base catalyst is 0.01-50, e. further comprising water in amount between 0.1-80 wt %, preferably 1-50 wt % relative to total weight of the catalyst composition, f. optionally further comprising an organic solvent at least part of which is an alcohol.

g. optionally further comprising an excess carbondioxide dissolved in the catalyst composition.

Organic solvent, in particular alcohol containing solvent can be added to the catalyst but is optional as it is for another purpose to improve hardening and viscosity build up of the crosslinking composition and is preferably added later to the crosslinkable composition if needed. The alcohol is not needed for the catalyst function and in a particular embodiment the catalyst does not contain alcohol. Similarly the excess carbondioxide is optional.

The invention in particular relates to a catalyst composition for use as a latent base crosslinking catalyst comprising a substituted carbonate salt $X^+$ $^-$O—C(=O)O—R according to formula 1, 3 or 4, in which the concentration of latent base is 0.03-3 meq/gram based on total weight, preferably further comprising 0.5-70 wt % water (relative to total weight of the catalyst composition). As described above these novel catalyst compositions show very useful properties as acid base catalyst in crosslinking compositions.

In a preferred embodiment, the catalyst composition further comprises a compound RO—C(=O)O—R wherein R is the same as R in formula 1, 3 or 4 but not hydrogen, wherein preferably the molar ratio of the amount of water to compound RO—C(=O)O—R (II) is near 1, the molar ratio of II to the mole of carbonate in the catalyst is 0.01-50 As described above, the catalyst composition has an improvement shelf life.

The invention also relates to the use of a substituted carbonate salt of the formula $X^+$ $^-$O—C(=O)O—R according to formula 1, 3 or 4 as a latent base crosslinking catalyst, preferably in RMA crosslinkable compositions, in particular to the use in a low temperature curing coating composition wherein curing temperature is between 0 and 80° C., preferably 5 to 60° C., most preferably between 5 and 30° C.

The invention further relates to the use of excess carbon dioxide solubilized in the paint formulation, e.g. supplied as dry ice (solid carbondioxide) to extend the pot-life of the crosslinkable composition comprising adding dry ice to the crosslinkable composition or to the coating composition or the catalyst composition according to the invention. Pressuring the paint with gaseous $CO_2$ would be another approach to this concept.

The foregoing more general discussion of the present invention will be further illustrated by the following specific examples, which are exemplary only.

The gel time is the time at which the sample is gelled and has lost all fluidity which was determined by making a mixture of the components and the latent base catalyst, placing 10 ml sample of the mixture in a 20 ml closed glass container (50% headspace) and keeping the sample at room temperature until gelation occurs. The container was tilted at regular time intervals and visually inspected to check whether or not the sample still flowed. The gel time is the time at which the container could be held upside down without flow of the sample.

Dust-dry and touch-dry times were measured according to the so-called TNO method with a wad of cotton-wool. Dust-dry time means the time needed for the coating after dropping the wad on the surface of the coating and after leaving it there for 10 second, to get no residue of the wool-cotton sticking onto the surface after blowing away the wad. For touch-dry time the same holds but now a weight load of 1 kg is applied on the wad for 10 seconds.

For measuring solvent resistance, spot tests were carried out by contacting the film with a small wad of cotton wool that had been completely soaked in solvent for 5 minutes. After the removal of the cotton wool, the spot was swept dry with a tissue and the damage to the film was visually observed and rated as 1 to 5. In this score 1 stands for completely intact and 5 for severely affected.

Persoz pendulum hardness was measured in a climatized room at 23"C, and 55+/−5% relative humidity. Reported molecular weights were measured by GPC, and expressed in polystyrene equivalent weights. Viscosities were measured with a TA Instruments AR2000 Rheometer, using a cone and plate setup (cone 4 cm 1°) at 1 Pa stress. Viscosity development in closed containers was measured using Gardner-Holt bubble tubes, and translating the times found to viscosity units using known relations.

A: Syntheses of Activated Methylene Resins

A-1. Preparation of Malonate Polyester A-1

Into a reactor provided with a distilling column filled with Raschig rings were brought 192.4 g of 2-butyl,2-ethyl-propanediol-1,3, 125 g of neopentylglycol, 269.3 g of dimethylmalonate; 0.58 g of dibutyltindioxide and 10 g of o-xylene. The mixture was heated to 140° C. with stirring under a nitrogen atmosphere. In two hours, about half of the expected methanol was distilled off, then 43 g of o-xylene was added and the temperature was progressively increased to 200° C. in 4 hours. After distilling off the rest of the expected methanol, most of o-xylene was removed from the mass, with the help of vacuum. The nearly colorless material was cooled down and diluted with o-xylene to a 90% solid content. The solution had a viscosity of 3.4 Pa·s as determined with a cone-and-plate rheometer, an OH value of 83.2 mg KOH/g, an Mn of 1900 and methylene equivalent weight of 224/g solid material (calculated from the theoretical input of the synthesis).

A-2. Preparation of Malonate Polyester A-2

Following the procedure of B-1, 86.50 g of 1,4-cyclohexanedimethanol, 96.20 g of 2-butyl, 2-ethyl-propanediol-1,3, 125 g of neopentylglycol, 326.72 g of diethylmalonate, 0.58 g of dibutyltindioxide and 10 g of o-xylene were fed into a reactor and reacted. The resulting nearly colorless material was cooled down and diluted with o-xylene to a 89.3% solid content. This solution had a viscosity of 9.0 Pa·s, an OH value of 84.2 mg KOH/g, an Mn of 1700 and a methylene equivalent weight of 219/g solid material.

A-3. Preparation of Acetoacetate Acrylic Resin A-3

A three-necked flask was charged with 17.7 grams α-methylstyrene dimer (AMSD, 0.075 mol) and 18.1 grams o-xylene. The flask is provided with a dropping funnel and a reflux cooler. The flask is placed in a heating bath with oil at 153° C. and the content of the flask is heated under nitrogen to the reflux temperature of xylene. The monomer/peroxide mixture, 132.5 grams acetoacetoxyethylmethacrylate (AAEM, 0.618 mol)) and 4.5 grams Trigonox 42S, is added dropwise from the dropping funnel to the flask in about 6 hours. During the reaction the reflux of xylene is decreasing which is compensated by an increase of the oil temperature to 170° C. After adding the given amount monomer-peroxide the flask was kept at the reaction temperature for another hour to complete the reaction. The resulting resin had an Mn of 1770, Mw 2825, and solid content SC of 83%.

A-4. Preparation of Acetoacetate Acrylic Resin A-4

In a similar procedure as described for A-3, another acetoacetate functional acrylic resin was prepared, now using 7.8 g AMSD, 11.9 grams o-xylene, 132.9 g AAEM, 10.7 g of HEMA and 4.6 g Trigonox 42S were used. Dowanol was used to dilute to SC of 74%. The resulting acrylic had an Mn of 3550 and Mw of 5540.

A-5: Preparation of Malonate Acrylic Resin A-5

An acrylic polyol intermediate was used (prepared from a mixture of 812 g styrene, 585 g methyl methacrylate, 1267 g butyl acrylate, 585 g hydroxypropyl acrylate, 21 g Cardura E-10P), polymerized to a MMD with Mn 2188, Mw 4844 and OH equivalent weight of 800. 1440 grams of this polyol was charged to a 3 L flask and 720 g of diethyl malonate was added along with a packed column and an unprimed Dean-Stark Trap. The reaction mixture was heated slowly to 200° C. by which time 75 g of ethanol had distilled off. Vacuum was attached to remove 432 g excess diethyl malonate. The malonated acrylic polymer was then thinned with 363 g of xylene, to a 80.1% SC, an Mn of 2901, and a Mw of 27200, and a malonate equivalent weight of 966.

A-6: Preparation of Malonate Polyester A-6

1980 g of dimethyl malonate and 268 g of trimethylolpropane were added to a 5 L flask equipped with a packed column and an unprimed Dean-Stark Trap. The solution was heated to 183° C. over 4.5 hours over which time 186 g of methanol had distilled out. Vacuum was attached and the excess dimethyl malonate was removed up to 183° C. Malonate equivalent weight is 145 g/mole.

A-7: Preparation of Malonate Polyester A-7

387 g of trimethylolpropane, 1780 g of neopentyl glycol, 1381 g of isophthalic acid and 50 g xylene were charged to a 5 L flask equipped with a packed column and a xylene-primed Dean-Stark trap and the mixture heated to 240° C. After 9 hours of reaction had proceeded to an acid value of 3.1 by which time 312 g of water had been distilled off. 1650 g of dimethyl malonate were then added and the reaction mixture slowly reheated to 223° C. over 7 hours, by which time 518 g of methanol had distilled through the packed column. Methyl Amyl Ketone (721 g) was then added to yield an 85% sc resin with Mn 1818, Mw 4598, and a malonate equivalent weight of 360 g/mole.

B: Acryloyl Containing Compounds

B-1: Trimethylolpropanetriacrylate (TMPTA) B1 was obtained from Aldrich, MW=296; 100 mPa·s at 25° C.; 10.1 meq C═C per gram.

B-2: Di-(trimethylolpropane)tetraacrylate (di-TMPTA) B2 was obtained from Aldrich, MW=466; 1250 mPa·s at 25° C.; 8.6 meq C═C per gram

B-3: An acryloyl urethane B-3 was prepared as follows. 243 grams of Vestanat T 1890 (IPDI trimer) was mixed with 160 grams of dry butylacetate, and heated to 65° C. 185 mg DBTL was added. 117 g of hydroxypropylacrylate (treated before with aluminum oxide to reduce acid levels, and mixed with an additional 25 mg MEHQ inhibitor) was added slowly over 90 minutes, temperature not exceeding 67° C. When feeding was completed, reaction was continued for 60 minutes at 65° C., and 3 hours at 75° C. NCO titration proves that the conversion is very high. Finally, 10 grams of methanol is added.

B-4: Acryoyl urethane B-4

1512 grams of IPDI Isocyanurate Trimer IDT-70B (ex Rhodia, 70% in butylacetate), 0.25 g butylated hydroxyl toluene and 0.38 g dibutyltindilaurate were added to a 3 L flask blanketed with nitrogen and heated to 80° C. 488 g of 2-hydroxyethyl acrylate were added over 1 hour at 80-81° C. The reaction mixture was then held at 80° C. for 6 hours during which time the NCO content was monitored by FTIR. It was thinned down with 194 g of butyl acetate. The resulting product has a 70.8% solids content.

C: Syntheses of Blocked Catalysts

C-1: tetrahexylammonium methylcarbonate 10 g of a 10% b.w. solution of tetrahexylammonium hydroxide (2.7 mmole) in methanol was mixed with 1 g (11 mmoles) of dimethylcarbonate (DMC) to yield a clear, colorless solution. Titration in 2-propanol with aqueous HCl after 24 hours revealed an equivalence point at a lower pH for the blocked versus the unblocked form and indicated complete blocking to 0.26 meq methylcarbonate per g solution.

C-2: tetradecyl, trihexylammonium methylcarbonate

With a similar procedure as for C-1, tetradecyl,-trihexylammonium hydroxide (2.48 mmole) in methanol was mixed with 12.5 mmoles of DMC. This yielded a clear, colorless solution of 0.348 meq of methylcarbonate per g solution C-3: tetrakisdecylammonium methylcarbonate As above, tetrakisdecylammonium hydroxide (1.0 mmole) in methanol was mixed with 6.7 mmoles DMC, to yield a clear solution of 0.15 meq methylcarbonate per g solution.

C-4: tetrabutylammonium methylcarbonate

As above, 30 g of a 40% b.w. solution of tetrabutylammonium hydroxide (46.0 mmole base) in methanol was mixed with 45 g DMC. After decantation of some precipitate, a clear solution of 0.68 meq methylcarbonate per g solution was obtained.

C-5 tetrabutylammonium ethylcarbonate

As described for C4, 46 mmole tetrabutylammonium hydroxide in methanol was mixed with 45 g diethylcarbonate, to yield a solution of 0.64 meq/g ethylcarbonate.

C-6 tetrabutylammonium propylenecarbonate

As described for C4, 31 mmole tetrabutylammonium hydroxide in methanol was mixed with 30 g (292 mmoles) of propylenecarbonate, to obtain a solution of 0.63 meq/g hydroxypropylcarbonate.

C-7 hexadecyltrimethylammonium methylcarbonate

As described for C-4, 34 mmole hexadecyltrimethylammonium hydroxide in methanol was mixed with 11 g DMC, to obtain a solution of 0.56 meq/g methylcarbonate.

C-8 benzyltrimethylammonium ethylcarbonate

As described for C-4, 24 mmole benzyltrimethylammonium hydroxide (Triton B) in methanol was mixed with 15 g diethylcarbonate, to obtain a clear solution of 0.93 meq/g ethylcarbonate.

C-9 trihexyl,methylammonium methylcarbonate

In a pressure reactor, 75 g of trihexylamine (0.278 mole) was mixed with 150 g DMC and 150 g methanol. This mixture was heated for 8 hrs at 100 to 130° C. at an internal pressure up to 10 bar. After cooling, the yellowish solution was obtained of 0.475 meq/g of trihexyl, methylammonium methylcarbonate, and 0.322 meq/g of trihexylamine.

C-10 trioctyl,methylammonium methylcarbonate

In a similar procedure as C-9, 100 g of trioctylamine (0.283 mole) was mixed with 152 g DMC and 150 g of methanol. After cooling down, from the yellowish solution the trioctylamine was separated in a funnel as the upper layer, and to each part of the remaining solution was added 1 part of Dowanol PM i.e. propyleneglycol methylether yielding clear solutions. Titration showed 0.124 meq/g TOA and 0.213 meq/g of trioctyl, methylammonium methylcarbonate.

C-11: Synthesis of a polymeric catalyst; random copolymer containing MADAM

A reaction vessel for producing acrylic resin, which was equipped with a stirrer, thermometer and a reflux condensing tube was charged with a homogenous mixture of 61.35 g alpha-methyl-styrenedimer (AMSD), 29.63 g of butylmethacrylate (BuMA), 18.04 g of 2-hydroxypropylmethacrylate (HPMA), 9.91 g 2-ethylhexylmethacylate (EHMA) and 12.66 g of 2-(dimethylamino)ethylmethacrylate (MADAM). The vessel was heated under stirring and brought at 145° C. while nitrogen-substituting the inside atmosphere of the reaction vessel. Under maintaining the temperature at 145° C. over a period of 5 hours, a mixture was dosed of 267.14 g of butylmethacrylate, 155.58 g 2-hydroxypropylmethacrylate, 89.13 g of ethylhexylmethacrylate, 113.94 g of 2-(dimethylamino)ethylmethacrylate (MADAM) and 11.62 g Perkadox AMBN (i.e. 2,2-Azodi(2-methyl-butyronitrile). Thereafter in 30 minutes 1.17 g Perkadox AMBN dissolved in 31.90 g heptanone-2 is added. The material was cooled down and 369 g of dimethylcarbonate and 369 g of methanol was added in order to obtain a 48% solution of the at random polymer with an Mn of 2400. It has an OH value of 78 mg KOH/g solid, and an amine value of 1.05 meq/g solid. The solution was then heated in a high pressure reactor at 100° up to 110° C. and at pressure of 7 to 10 bar for about 12 hours, to yield a solution containing 0.48 meq/g methylcarbonate and 0.05 meq/g of remaining tertiary amine.

C12: tetrabutylammonium bicarbonate

A tetrabutylammoniumbicarbonate solution was made by diluting 20 grams of a 40 wt % tetrabutylammonium hydroxide solution in methanol with 30 grams of methanol, and treatment with carbondioxide gas until a content of 0.66 meq blocked base per g solution was found by titration.

C13: tetrahexylammonium bicarbonate

A tetrahexylammonium bicarbonate solution was made by treatment of a 10 wt %. tetrahexylammonium hydroxide solution in methanol with carbondioxide gas until a content of 0.27 meq/g bicarbonate was found by titration.

C14: tetrabutylphosphonium methylcarbonate

An aqueous solution of tetrabutylphosphonium hydroxide (40% in water) was diluted with methanol to a 10 wt % solution. To 10 g of this solution (3.6 mmole base), 1 g DMC was added (22 mmole). After a day, it was titrated, and contained 0.346 meq/g blocked base.

C15: tetramethylammonium methylcarbonate

A solution of 25 wt % tetramethylammonium hydroxide in methanol was mixed with 10 grams of DMC. Initially turbid, the solution becomes clear, and exhibits a blocked base concentration of 1.37 meq/g.

C16: benzyltrimethylammonium bicarbonate

As described for C-13, a solution of benzyltrimethylammonium hydroxide (Triton B) in methanol was reacted with gaseous CO2, to obtain a clear solution of 0.986 meq/g.

C17: prepared from aqueous tetrabutylammonium hydroxide and dimethylcarbonate

A flask is charged with:
35.8 grams of a 40% tetrabutylammonium hydroxide solution in water
21.7 grams dimethylcarbonate
1.5 grams isopropanol This mixture is stirred gently for 20 hrs, and its active base content was determined by titration to be 0.7 meq/g.

C18: prepared from 1M methanolic tetrabutylammonium hydroxide and dimethylcarbonate A flask is charged with:
76.68 g of 1M tetrabutyl ammonium hydroxide solution in methanol
77 g of dimethylcarbonate
5 g of methanol Stirred for 20 hours, allowed to settle for a few days, filtered and then analysed. Titration found the catalyst concentration to be 0.455 meq/gram of solution.

Other Chemicals applied in the examples

TMG=tetramethylguanidine MW=115.18; b.p. 160° C.
DBU=1,8-diazabicyclo[5,4,0]undec-7-ene MW=152.24; b.p. 261° C.
DABCO=1,4-diazabicyclo[2.2.2.]octane MW=112.18
TBAH=40% solution of tetrabutylammonium hydroxide (MW=259.46) in methanol, unless otherwise specified
THAH=10% solution of tetrahexylammonium hydroxide (MW=371.68) in methanol
Setalux 8539 BA76 from Nuplex Resins bv. Epoxy containing polyacrylate in butylacetate s.c.=76% 4.5 meq epoxy/g solids Visco: 14 Pa·s at 23° C.
Acetylacetone
TMPTA: trimethylolpropanetriacrylate
TMPTAA: trimethylolpropanetriacetoacetate
Dowanol PMA: propylene glycol methyl ether acetate
MPK: methyl propyl ketone
MIBK: methyl isobutyl ketone
MAK: methyl amyl ketone
NMP: N-methylpyrrolidone
Tecsol A: product obtained from Eastman Chemicals, composed of blend of 85.8% ethanol, 9% Isopropanol, 4.2% methanol and 1% MIBK. Composition numbers were used according to Eastman information
Setalux 17-1450 is an acetoacetate acrylic resin from Nuplex Resins, 65% s.c. in methyl n-amylketone, with an acetoacetate equivalent weight of 1150 g/mole.
Setalux 26-3701 is an acetoacetate polyester diluent from Nuplex Resins, 100% solids, with an acetoacetate equivalent weight of 130.

EXAMPLE 1

A formulation was made by the sequential mixing of
100 g of solution of malonate polyester A-1
25 g of Dowanol PMA
19.5 g of the catalyst solution C-1
67.4 g of acryloyl component B-2 (diTMPTA)

This formulation has a viscosity of 110 mPa·s at a calculated VOC of 250 g/L. The ratio of malonate-methylenes groups to acryloyl groups is 1:1.5, the amount of catalyst 0.039 meq/g solids.

The gel time of this solution was more than 24 hrs. Using a 120-micron doctor blade, the formulation was applied onto glass plates shortly after their preparation and subsequently cured at room temperatures to obtain a 85 micron thick clear, colorless and highly glossy films. TNO dust-dry times of less than 30 minutes, and touch-dry times of less than 45 minutes were found. Persoz pendulum hardness build-up is given in the tale below:

| Days | Persoz hardness (secs) |
| --- | --- |
| 1 | 62 |
| 2 | 92 |
| 9 | 137 |
| 20 | 148 |
| 30 | 149 |

Spot tests on these films, cured for 1 month at RT, gave the following results.

| Contact time and type of solvent | Score |
| --- | --- |
| 5 minutes with xylene | 1 |
| 1 night with water + | 2 |
| 2 hrs of recovery | 1 |
| 1 minute with MEK | 2 |

EXAMPLE 2

A formulation was prepared with the following components, as in example 1:
100 g of malonate polyester solution A-2
26 g of o-xylene
19.0 g of the catalyst solution C-1
67.0 g of acryloyl component B-2 (diTMPTA)
0.32 g of Byk 310

The catalyst concentration was 0.032 meq/g solids. This formulation has a calculated VOC of 253 g/L, mole ratio's of the components similar to example 1. The geltime of the solution was more than 24 hours. Upon application, as in example 1, and cure at RT, dust-dry times of less than 30 min, and touch-dry times of less than 1 hour were found. Persoz hardness build-up of the film w (65 micron dry) was as follows:

| Days | Persoz hardness (secs) |
| --- | --- |
| 1 | 56 |
| 2 | 99 |
| 3 | 122 |
| 9 | 149 |
| 20 | 170 |
| 30 | 170 |

Spot tests on the films cured 1 month at RT were carried with the following results:

| Contact time and type of solvent | Score |
| --- | --- |
| 5 minutes o-xylene | 1 |
| 1 night with water + | 2 |
| 2 hrs of recovery | 1 |
| 1 minute MEK | 2 |

EXAMPLE 3

A formulation was made of the following components
100 g of malonate polyester solution A-2
22 g of o-xylene
19.0 g of catalyst solution C-1
56.0 g of acryloyl component B-2 (DMPTA)
The catalyst concentration was 0.034 meq/g solids. The formulation has a calculated VOC of 252 g/L., and a gel time of the solution of more than 24 hrs. Upon application at RT, dust-dry times of less than 30 min and touch-dry times of less than 1 hour were found. Persoz hardness (sec) was measured on films cured under different conditions:

|  | Ambient | after 10' flash-off at RT, 30' @ 80° C. | after 10' flash-off at RT, 24' at 140° C. |
|---|---|---|---|
| 1 day | 56 | 170 | 330 |
| 1 month | 150 | 180 | — |

EXAMPLE 4

Formulations with a solids content of 72 to 75% were made by the successive addition and mixing of the following components
100 g of malonate polyester solution A-1
30 g of Dowanol PMA
a certain amount and type of catalyst given in the Table and
50.0 g of B-1 (TMPA)
In all formulations, the ratio of malonate-methylene groups to acryloyl groups was 1:1.26. On glass, 120 micron wet films were drawn. Results are shown in the table below. It can be seen that gel times are found in the order of hours, with C-1 excelling through a pot life of more than 24 hrs. In all cases, dust- and touch-dry times are short.

| Type of catalyst | C-4 | C-5 | C-6 | C-7 | C-8 | C-1 |
|---|---|---|---|---|---|---|
| Grams of catalyst | 6 | 7.5 | 8.4 | 7 | 4.5 | 15 |
| [cat] in meq/g solids | 0.029 | 0.034 | 0.037 | 0.029 | 0.034 | 0.029 |
| geltime (hrs) | 5 | 3 | 4 | >>3 | 6 | >24 |
| RT Cure | | | | | | |
| Appearance | O.K. | O.K. | O.K. | oozing | oozing. | O.K. |
| dust dry TNO time (min) | 30 | 30 | 30 | 255 | 60 | 30 |
| touch-dry TNO time (min) | 30 | 45 | 30 | 270 | 120 | 30 |
| Persoz hardness 1 month | 73 | 65 | ND | ND | 34 | 57 |
| Stoving 10' @ RT and 30' @140° C. | | | | | | |
| Appearance | O.K. | O.K. | O.K. | O.K. | O.K. | O.K. |
| Persoz hardness 1 day | 344 | 322 | 270 | 163 | 314 | 325 |

EXAMPLE 5

Formulations with a solid content of 75% were made by the successive addition and mixing of the following components
100 g of malonate polyester solution A-2
amount of Dowanol PMA given in the table
a certain amount and type of catalyst given in the Table and
56.0 g of B-2 (i.e. di-trimethylolpropane tetraacrylate)
The ratio of malonate-methylene groups to acryloyl groups was 1:1.26. On glass 120 micron wet films were drawn. Both catalysts give gel times of more than 24 hrs, similar to C-1; C-3 was not compatible, and curing was insufficient.

| Type of catalyst | C-2 | C-3 |
|---|---|---|
| Grams of catalyst solution | 11.6 | 26 |
| [cat] in meq/g solids | 0.029 | 0.029 |
| Dowanol PMA (g) | 30 | 15 |
| geltime (hrs) | >24 hrs | >24 hrs |
| RT Cure | | |
| Appearance | O.K. | Sticky |
| dust dry TNO time (min) | <60 | >24 hrs |
| touch-dry TNO time (min) | <60 | >24 hrs |
| Persoz hardness 2 days | 34 | ND |
| Stoving 10' F.O @ RT and 30' @140° C. | | |
| Appearance | O.K. | Not O.K. |
| Persoz hardness 1 day | 280 | 190 |

COMPARATIVE EXAMPLES 1 and 2

Formulations (SC 75%) were produced by mixing the parts A and B Part A: 100 g of malonate polyester solution A-1, 14 g o-xylene, 11.3 g of a 20% solution of DABCO in MEK; Part B: 41.7 g of B-1 TMPTA, 9.3 g (Comp. Ex. 1) or 5.9 g (Comp. Ex. 2) of Setalux 8539BA76 (an epoxy functional resin ex Nuplex Resins), 10.5 g of xylene. The ratio of methylene groups (in the malonate) versus acrylate groups was 100 to 105 equivalents, respectively. 5.0 mole DABCO and 7.8 mole of epoxy groups were used per 100 mole of methylene groups. for Comp. Ex. 1 and 5.0 mole DABCO and 5.0 mole of epoxy groups were used per 100 mole of methylene groups for Comp. Ex. 2. On glass 120 micron wet films were drawn and both cured ambient and by stoving. The results are presented in the following table.

| Comparative example | 1 | 2 |
|---|---|---|
| Mole % DABCO on CH2 (malon) | 5 | 5 |
| Mole % epoxy on CH2 (malon) | 7.8 | 5 |
| geltime (min) | 90 | 135 |

| Comparative example | 1 | 2 |
|---|---|---|
| RT Cure | | |
| Appearance | O.K. | Not.O.K. |
| dust dry TNO time (min) | 240 | Sticky edges |
| touch-dryTNO time (min) | 270 | Sticky edges |
| Persoz hardness after 2 days | 134 | 81 |
| Stoving 10' F.O @ RT and 30' @140° C. | | |
| Appearance | Yellowish | yellowish |
| Persoz hardness 1 day | 270 | 190 |

From the table one concludes that with the DABCO/epoxy catalyst (yielding an in situ formed strong base) the gel time is rather limited, whereas dust- and touch-dry times are clearly longer. Improving dry times by adding more catalyst will only limit gel times further. Increasing the amount of acryloyl groups did not result in an improvement. Adding some 4-t-butylphenol extended the potlife somewhat, but discoloration of the film occurred after some weeks by exposure to daylight. The DABCO/epoxy system also yields yellowing under stoving conditions.

COMPARATIVE EXAMPLE 3 up to 6

A high solid formulation was made by the successive addition and mixing of the following components
100 g of malonate polyester solution A-1
36 g of Dowanol PMA
an amount of the catalyst solution given in the table
56.0 g of B-2
1.00 or 0.5 equivalent of blocked or free base was applied per 100 equivalents of methylene groups. Films were drawn on glass with a wet thickness of 120 micron.

| Comparative example | 3 | 4 | 5 | 6 |
|---|---|---|---|---|
| Type of cat | 10% THAH in methanol | TBAH-HAc [a] | TMG in DMC [b] | DBU solution in PC [c] |
| Amount of solution (g) | 14.8 | 2.56 | 2.75 | 3.65 |
| Mole % on CH2 (malon) | 1 | 0.5 | 1 | 1 |
| Gel time | 5 minutes | >3 days | 90 minutes | 60 minutes |
| | | RT Cure | | |
| Appearance | ND | Not O.K. | Not O.K. | O.K. |
| dust dry TNO time(min) | | >1 day | <3 days | 90 |
| touch-dry TNO time (min) | | >1 day | >3 days | 120 |
| Persoz hardness 2 days | | Tacky | tacky | 35 |
| | Stoving 10' F.O @ RT and 30' @140° C. | | | |
| Appearance | ND | Severe scorching | Not O.K. | O.K. |
| Persoz hardness 1 day | | ND | Tacky | 40 sec |

[a] 25% b.w. solution in methanol of tetrabutylammonium hydroxide neutralized with acetic acid; 0.78 mmole blocked base/g solution
[b] 16.7% b.w. tetramethylguanidine (TMG) dissolved at R.T. in dimethylcarbonate yielding according to titration 1.45 meq of unblocked base/g solution
[c] 16.7% b.w. 1,8-diazabicyclo[2.2.2.]octane (DBU) dissolved at R.T. in propylenecarbonate yielding according to titration 1.096 meq of unblocked base/g solution From the table it is obvious that the amidine type catalysts TMG or DBU and the unblocked tetrahexylammoniumhydroxide in high solid Real Michael Addition formulations cannot combine long gel times with short drying times, as the examples according to our invention do. Tetrabutylammonium blocked with a carboxylic acid as acetic acid yields an excellent gel time but no ambient fast dry, a lot of scorching at stoving conditions, ruining appearance.

EXAMPLE 6 and 7

Mixed were:

100 g of malonate polyester solution A-1,

Dowanol PMA or o-xylene as given in the Table, an amount of catalyst of C-9 or C-10 as given in the Table 67.0 g of B-2

The formulation of both examples had a solid content of 75%.
All films obtained were colorless and highly glossy.

| Example | 6 | 7 |
|---|---|---|
| Type of cat | C-9 | C-10 |
| Amount of cat solution (g) | 12.5 | 15.0 |
| [cat] in meq/g solids | 0.038 | 0.021 |
| Solvent | 33 g of o-xylene | 30 g of Dowanol PMA |
| Gel time | 8 hrs | 4 hrs |
| RT Cure (120 micron wet) | | |
| Appearance | O.K. | O.K. |
| dust dryTNO time (min) | <60 minutes | <60 minutes |
| touch-dry TNO time (min) | <60 minutes | <60 minutes |
| Persoz hardness 2 days (sec) | 86 | 64 |
| Persoz hardness 1 month | 130 | ND |
| Forced drying 10' @ RT and 30' @80° C. (90 mu wet) | | ND |
| Appearance | 100 | |
| Persoz hardness after 1 day (secs) | 110 | |
| Persoz hardness after 1 month | 130 | |

-continued

| Example | 6 | 7 |
|---|---|---|
| Stoving 10' F.O @ RT and 30' @140° C. (90 micron wet) | | |
| Appearance | ND | O.K. |
| Persoz hardness after 1 day (secs) | | 320 |
| 5' Spottest with o-xylene | | Intact |
| Overnight contact with water | | Intact |

EXAMPLE 8

A formulation was made by the sequential mixing of:
100 g of malonate polyester solution A-2
35 g Dowanol PMA
7.5 g of catalyst solution C-11 56.0 g of B-2
The catalyst concentration was 0.025 meq/g solids. The formulation had a solid content of 75.6%. The geltime of the formulation was more than 7 hours. Using a 90 micron doctor's blade, the formulation was applied onto a glass plate and subsequently, after a flash-off at RT of 10', cured 24' at 140° C. resulting in a clear and high glossy film with a Persoz hardness of 300 sec.

EXAMPLE 9

A formulation with a solid content of 75% was made by the sequential mixing of
100 g of malonate polyester solution A-1
30 g of Dowanol PMA
6 g of C-12
50.0 g of A-1(TMPTA)
The catalyst concentration was 0.029 meq/g solids. On glass 120 micron wet films were drawn, to end up colorless, clear and glossy. Apart from the rather cumbersome preparation with gas of this blocked catalyst relative to that of the alkylcarbonate catalysts (see the C-4 catalyst), the tetrabutylammonium bicarbonate behaves quite well in this high solid formulation.

| Type of catalyst: C12 | Tetrabutylammoniumbicarbonate in methanol |
|---|---|
| grams of catalyst | 6 |
| mole % on CH2 (malon) | 1 |
| gel time (hrs) | 3.5 |
| RT cure | |
| Appearance | O.K. |
| dust dry TNO time (min) | 30 |
| touch-dry time (min) | 30 |
| Persoz hardness 1 month | 70 |

EXAMPLE 10

A formulation with a solid content of 75% was made by the successive addition and mixing of the following components
100 g of malonate polyester solution A-1
25 g of Dowanol PMA
17 grams of C13
67.4 g of B-2
The gel time of the formulation (s.c. of 76%) was more than 24 hrs. On glass 90 micron wet films were drawn. All films had TNO dust and touch-dry times less than 1 hour, and were colorless, clear and glossy. Persoz hardness was 103 sec after 14 days at RT. Stoving films for 30' @ 140° C. yielded a Persoz hardness of 317 secs.

EXAMPLE 11

A formulation was made based on malonate polyester A-1 (100 parts), acryloyl component B-2 (76.8 parts), catalyst solution C14 (12.7 parts), Dowanol PMA (36 parts) to obtain a lacquer with sc 75% and catalyst concentration 0.026 meq/g solids. Water content in this formulation (introduced along with the catalyst solution) was about 0.75 wt %. The gel time of this formulation was found to be 50 hours. Upon application onto glass as discussed in earlier examples, dust-dry and touch-dry times were evaluated to be less than 15 minutes.

EXAMPLE 12

A series of formulations was made, as described earlier, consisting of: Malonate polyester resin A-1 (9.3 g solids), acryloyl component B-2 7.26 g (malonate CH2-acryloyl 1:1.5), and catalyst of type C-4 (to obtain a level of 0.034 meq/g solids), and diluted with Dowanol PMA to 77% s.c. A small amount of water (numbers listed as wt % on total) was added to the mixture of catalyst and malonate resin, before the acryloyol component was added. The table below details the results for gel time and drying. The results show strikingly that the presence of a small amount water leads to a very significant improvement of the gel time, while maintaining very fast drying characteristics when applied at RT.

| code exp. | A | B | C | D | E | F |
|---|---|---|---|---|---|---|
| % water in CC | 0 | 0.14 | 0.3 | 0.55 | 1.11 | 1.36 |
| geltime (h) | 2.5 | 3.5 | 3.5 | 4.5 | 19 | 33 |
| TNO-drying | | | | | | |
| dust-dry (min.) | 15 | 15 | 15 | 15 | 15 | 15 |
| touch-dry (min.) | 30 | 15 | 30 | 30 | 45 | 45 |

EXAMPLE 13

A series of formulations was made, as described in example 12, consisting of: Malonate polyester resin A-1 (9.3 g solids), acryloyl component B-2 7.26 g (malonate CH2-acryloyl 1:1.5), and catalyst of type C-4 (to obtain a varying amount in meq/g solids), diluted with Dowanol PMA to 77% s.c. The amount of water added was 1 wt % on total formulation. The table below details the results for gel time and drying.

| code exp. | A | B | C |
|---|---|---|---|
| cat (meq/g solid) | 0.034 | 0.04 | 0.068 |
| gel time (h) | >24 h | >24 h | >24 h |
| TNO-drying (min.) | | | |
| dust dry | 15 | 15 | <15 |
| touch dry | 30 | 30 | 15 |
| Persoz hardness | | | |
| after 1 day | 65 | 62 | 64 |
| after 1 week | 116 | 101 | 107 |

It can be seen that the gel time of the systems remains very long, also if the amount of catalyst is raised.

EXAMPLE 14

A formulation (75% sc) was prepared, as described above, with malonate polyester A-1 9 g solids, acryloyl component B-2 6.72 g, catalyst C-13 (tetrabutylammonium bicarbonate) at 0.04 meq/g solids, xylene, and an amount of water corresponding to 1 wt % on total. The gel time of this formulation was more than 72 hrs, with dust-dry and touch dry times of <15 minutes.

EXAMPLE 15

Formulations were prepared as above, with components A-1 and B-2 (ratio as example 13), and an amount of catalyst C-15 so that the catalyst concentration was 0.039 meq/g solids. The formulation with and without 1 wt % water were compared: without water, this is 3 hours, with 1 wt % water, it is more than 24 hours.

EXAMPLE 16

Formulations were prepared as above, with components A-1 and B-2 (ratio as example 13), and an amount of catalyst C-16 so that the catalyst concentration was 0.039 meq/g solids. The formulation with and without 1 wt % water were compared: without water, this was 5.5 hours, with 1 wt % water, it is more than 24 hours. Drying rates are still fast also in the presence of water.

EXAMPLE 17

A formulation (66.3% sc) was prepared based on acetoacetate resin A-3 (10 g), acryloyl component B-2 (5.8 g), catalyst C-1 (0.04 meq/g solids) and Dowanol PMA. The gel time of this formulation was about 4 hours; upon application as described above, a dust dry time of 60 min was found, and a touch-dry time of 105 minutes. Persoz hardness was 276 sec after 3 days at RT.

EXAMPLE 18

Formulations were prepared of acetoacetate resin A-4, acryloyol component B-2, and catalyst C-4 (S.C. 77%, acryloyl to acetoacetate ratio 1.5:1, catalyst 0.035 meq/g solids), and a varying amount of water (0, 0.4, 1.1 and 2.0 wt % on total solution). The variation of the amount of water had no significant effect on drying times, nor on gel times (all around 2.5 hours). No significant beneficial effect of water on the gel time was observed for these acetoacetate resins, in contrast to the observation for malonate functional resins.

EXAMPLE 19

A formulation (SC 77%) was prepared based on a mixture of two activated methylene resins, A-1 (malonate) and A-3 (acetoacetate) in a ratio of 9:1 (based on moles activated methylene), acryloyl component B-2 and catalyst C-4 (0.039 meq/g solids). Results were compared to a similar formulation without the A-3 component, giving the results as follows:

| | binder | | | | | |
|---|---|---|---|---|---|---|
| | malonate-acetoacetate blend | | | malonate only | | |
| wt % water | Gel time | Dust-dry | Touch-dry | Gel time | Dust-dry | Touch-dry |
| 0% | 2 h | 30' | 45' | 3-6 h | <15' | 15' |
| 1% | 4 h | 30' | 45' | >19 h | 15' | 30' |

| | binder | |
|---|---|---|
| | malonate-acetoacetate blend | Malonate only |
| | % water in formulation | |
| | 0% | 1% | 0% | 1% |
| Persoz hardness (sec) 1 day | 105 | 115 | 49 | 53 |

It can be seen that replacing only 10% of malonate functional material with acetoacetate functional material, a strong impact is observed, much more than is to be anticipated based on the relatively small fraction of acetoacetate to malonate. Properties typical of the acetoacetate (a shorter gel time, no beneficial effect of water on this), slower drying, built increased hardness for RT cure, are strongly translated into the 90-10 blend results. It is believed that this more than proportional effect is due to the order of reaction, the more acidic acetoacetate reacting mostly before the less acidic malonates if both have to compete for available base for deprotonation.

The negative impact of the faster reaction of acetoacetate resins in the pot on the gel time and pot life, can be minimized by choosing a component of a lower functionality than the A-3 resin used above, to be blended with the malonate resins (viscosity consequences of such premature reaction being less)

The next examples illustrate the impact that similar minority components (RMA active, but with lower pKa than malonate) can have on the overall performance. A significant beneficial impact based on hardness build-up, but also on appearance of these fast-drying systems is observed.

EXAMPLE 20

Formulations (77% SC) were prepared as above, based on malonate resin A-1, acryloyl component B-2 (150% relative to activated CH2), catalyst C-4 (at a level of 0.057 meg/g solids). In this series, part of the malonate resin A-1 was substituted for a low molecular weight acetoacetate component, or acetylacetone, so that effectively 10 mole % of the standard malonates were substituted. No water was added. The results of the compositions thus obtained are given below.

| code exp. | Substitute | mole % | SC (%) | gel time (h) | dust dry (min) | touch dry (min) |
|---|---|---|---|---|---|---|
| A | None | 0 | 75.0 | 3.5 | 10 | 15 |
| B | methyl-acetoacetate | 10 | 76.8 | 3 | 20 | 25 |
| C | AATMP | 10 | 76.9 | 3.5 | 15 | 25 |
| D | Acetylacetone | 10 | 75.8 | 6 | 20 | 25 |

Using low functionality substitutes like this, even an improvement in potlife can be seen in the case of acetylacetone.

| | | | | film appearance | | |
|---|---|---|---|---|---|---|
| code exp. | Substitute | mole % | SC (%) | RT cure | 30' 60° C. | 30' 80° C. |
| A | None | 0 | 75.0 | rough | Rough | wrinkles |
| B | methyl-acetoacetate | 10 | 76.8 | smooth | smooth | smooth |
| C | TMPTAA | 10 | 76.9 | smooth | acceptable | acceptable |
| D | Acetylacetone | 10 | 75.8 | smooth | smooth | smooth |

For these very fast drying formulations, the substitution of part of malonates leads to an improved appearance. Persoz hardness development as function of time in days is given in the tables below. Persoz hardness in sec

| RT cure time (days) | A None | B 10% MeAA | C 10% TMPTAA | D 10% AA |
|---|---|---|---|---|
| 0.2 | 42 | | 99 | 126 |
| 1 | 65 | 93 | 117 | 145 |
| 7 | 139 | 111 | 142 | 162 |
| 14 | 142 | 106 | 152 | 163 |
| 21 | 145 | | | 172 |
| 28 | 149 | 107 | 166 | 174 |

It can be seen that despite the introduction of a very soft, low functionality component, the hardness development is not reduced, but even significantly improved especially in terms of the early hardness. Persoz hardness in sec.

| 30' 60 C. cure time (days) | A None | B 10% MeAA | C 10% AATMP | D 10% AA |
|---|---|---|---|---|
| 0.02 | 69 | 207 | 156 | 191 |
| 1 | 74 | 138 | 137 | 172 |
| 7 | 91 | 143 | 156 | 177 |
| 14 | 98 | 136 | 156 | 185 |
| 21 | 115 | | | 187 |
| 28 | 130 | 131 | 169 | 187 |

For the forced dry conditions, in which after a 10 minute flash-off, a 30 minute curing at 60 C was employed, the advantages in hardness build-up are even more evident. At 80 C cure, the advantages become less pronounced again since the reference formulation already has a relatively high hardness following the high temperature treatment.
Persoz Hardness in Sec.

| 30' 80 C. cure | A None | B 10% MeAA | C 10% AATMP | D 10% AA |
|---|---|---|---|---|
| 0.02 | 151 | 162 | 194 | 225 |
| 1 | 130 | 132 | 191 | 219 |
| 7 | 147 | 150 | 182 | 228 |
| 14 | 147 | 144 | 196 | 234 |
| 21 | 148 | | | 236 |
| 28 | 168 | 142 | 197 | 233 |

Spot tests with xylene also indicate that the introduction of these low functionality components did not lead to reduced solvent resistance under the conditions tested, it is even slightly better.

EXAMPLE 21

In this example, the beneficial effect of the substitution of a part of the malonate functional groups by a low functionality more acidic CH2 functional group component is demonstrated if a catalyst system is used based on DABCO-epoxy. The epoxy component used here was Setalux 8503, an epoxy-functional acrylic from Nuplex Resins. The gel time more than doubles upon addition of 11 C—H equivalent % acetylacetone.

| Addition | A None | B acetylacetone |
|---|---|---|
| C—H equivalent % moderator | 0% | 11% |
| mmole malonate resin A-1 | 100 | 100 |
| mmole acryloyol B-1 | 105 | 117 |
| mmole epoxy (Setalux 8503) | 7.9 | 8.8 |
| mmole DABCO | 5.0 | 5.6 |
| gel time (SC 72%) | 1 h | 2.5 h |
| TNO drying times | | |
| Dust dry | 2.5-3.5 h | 3-4 h |
| Touch dry | >20 h | >20 h |

EXAMPLE 22

A pigmented formulation was prepared, in which malonate resin A-1 (167 g) was pigmented (using 5.95 g Dysperbyk 2163, 134 Kronos 2310 pigment, 0.22 g Byk 370), and formulated with 48.6 grams Dowanol PMA and 122.8 g DMPTA (B-2). To this base resin, AATMP was added to have a 13 mole % substitution of malonate by acetoacetate functions, and 0.04 meq/g solids of a catalyst C-4 solution that also contained water, so that the final water content was 2 wt % on solids not counting pigment. Solid content of the formulation, not counting the pigments, was 80%. Gel time observed was more than 7 hours, dust dry time 15 minutes, touch dry 30 minutes. Appearance of the film was good, with Persoz hardness 82 sec after 5 hrs of drying at RT.

EXAMPLE 23

When lacquer formulations are compared, in which the catalyst solution is premixed with one of the components, the methylene and acryloyl components being mixed later as a 2K systems, it can be observed that upon standing before mixing, some loss of activity occurs.

In all cases, final formulations were targeted based on malonate resin A-1, DMPTA (B-2) (so that mole ratio acryloyl to malonate is 1.5:1), water to the level of 1 wt % on total, and catalyst C-4 (0.04 meq/g solids). When water/catalyst and A-1 are premixed, to be blended with B-2 later after a variable amount of time, the following results were obtained (days=days between premix and total formulation):

| | | | TNO-drying | | Persoz Hardness (sec) | |
|---|---|---|---|---|---|---|
| experiment | days | gel time | dd (min) | td (min) | 1 day RT | 7 days RT |
| A | 0 | >24 h | 15 | 30 | 53 | 94 |
| B | 1 | >24 h | <30 | 30 | 44 | 87 |
| C | 2 | >24 h | 30 | 45 | 40 | 79 |
| D | 7 | >24 h | >2 h | >2 h | 19 | |

When catalyst was premixed with the B-2, to be formulated later with A-1 in which water was premixed, the following results were obtained:

| | | | TNO-drying limits | | Persoz Hardness (sec) | |
|---|---|---|---|---|---|---|
| experiment | days | gel time | dd (min) | td (min) | 1 day RT | 7 days RT |
| E | 0 | >24 h | 15 | 30 | 53 | 94 |
| F | 1 | >24 h | 15 | 30 | 52 | 107 |
| G | 2 | >24 h | 15 | 30 | 45 | 102 |
| H | 7 | >24 h | 30 | 45 | 47 | |

It can be observed that upon standing, the prolonged exposure of the catalyst system to the ester components in combination with water, may lead to some loss of reactivity, potentially to some slow hydrolysis of the ester groups present, leading to acid that will reduce the amount of base that can be effectively generated. This loss of reactivity appears to be more prominent when premixing is done of the blocked base and water with the malonate resin, which is known to exhibit a relatively fast hydrolysis compared to other ester groups.

Therefore, it can be concluded that this system may be best employed either as a three component system (in which catalyst and both polymer components are formulated into a paint as 3 components). When a two-component system application is desired, it is preferred to employ a premix of activated methylene component and acryloyl component, to be activated with the catalyst upon final formulation.

EXAMPLE 24

This example illustrates that it is possible to use also urethane acryloyl compounds in combination with the present catalyst system. A formulation was made, as described earlier, based on A-1 and B-3 (urethane acrylate), in a mole ratio malonate to acryloyl 1:1.5, SC 63.5.%, and an amount of catalyst C-4 to end up with 0.028 meq/g solids. Gel time was between 5 and 20 hours, dust-dry and touch-dry times were 10 and 15 minutes, respectively. Good MEK spot test results were obtained for RT cured samples. Persoz hardness (in sec) build-up for the RT cured sample was as follows:

| Time (days) | Persoz hardness (sec) |
|---|---|
| 0.08 | 86 |
| 0.21 | 124 |
| 1 | 210 |
| 5 | 300 |
| 7 | 297 |
| 14 | 317 |
| 28 | 320 |

EXAMPLE 25

To test the stability of CO2 blocked catalyst solutions against loss of CO2, to simulate a situation in which the container of the catalyst solution is left open for an extended time before being closed and re-used later, a solution was prepared of 11.04 g of tetraethylammonium bicarbonate in 70 grams of methanol. Part of this solution was intentionally allowed contact with the environment by widely opening the container for an hour. Subsequently, the container was closed again and the catalyst solution allowed to equilibrate overnight. Similar experiments were done with the same original solution, to which an addition 8 grams of DMC was added, and a third set in which on top of the DMC, also 8 grams of water was added. After the night of re-equilibration, these 6 catalyst solutions were added to a standard premixed formulation of 100 parts of A-1, 77 parts of B-2, 30 parts of xylene and 12 part of Dowanol PMA (nominally 0.05 meq/g solids). Gel times were tested: In both cases without water, a reduction in gel time was observed from approximately 5 to <3 hours, following leaving the catalyst container open. The catalyst solution that contained both DMC as well as water, maintained a very long gel time (>24 hrs) when used in a paint, also after having the container left open. It is believed that the combination of DMC and water allows any strong base species being formed unintentionally by premature $CO_2$ evaporation to be reformed to blocked methocarbonates. The impact of solvent type and level is illustrated in the following examples.

EXAMPLE 26

Paints were formulated as follows (amounts in gr), with a blocked base catalyst concentration at 0.04 meq/g solids:

| | |
|---|---|
| Example A-5 | 24.00 |
| Example A-6 | 1.00 |
| Example B-4 | 4.63 |
| TMPTA | 3.84 |
| Catalyst C-17 | 1.37 |

To this formulation was added additional solvent to lower solids content to 51%. The composition of the solvent in paints M1 to M6 (in wt % to total composition) are described in the Table below.

| | Description | water | DMC | BuAc | xylene | MPK | NMP | Ethanol | methanol | MIBK | 2-propanol |
|---|---|---|---|---|---|---|---|---|---|---|---|
| M1 | Tecsol A | 0.90 | 0.70 | 2.42 | 8.73 | | | 31.48 | 1.58 | 0.33 | 3.37 |
| M2 | 50/50 Tecsol A/MPK | 0.90 | 0.70 | 2.42 | 8.73 | 18.35 | | 15.74 | 0.79 | 0.17 | 1.71 |
| M3 | 25/75 Tecsol A/MPK | 0.90 | 0.70 | 2.42 | 8.73 | 27.52 | | 7.87 | 0.40 | 0.08 | 0.89 |
| M4 | 10/90 Tecsol A/MPK | 0.90 | 0.70 | 2.42 | 8.73 | 33.04 | | 3.13 | 0.16 | 0.03 | 0.39 |
| M5 | MPK | 0.90 | 0.70 | 2.42 | 8.73 | 36.69 | | | | | 0.06 |
| M6 | 80/20 Tecsol A/NMP | 0.90 | 0.70 | 2.42 | 8.72 | | 7.34 | 25.20 | 1.26 | 0.26 | 2.71 |

The viscosity rise in a closed tube was evaluated over time (time in minutes, viscosity in centipoises) using Gardner-Holt bubble tubes. The measurement results are indicated in the Table below.

It can be seen that the addition of Tecsol A (major component being ethanol), even to levels as low as 3% on total (M4), significantly reduces the rate of viscosity rise compared to a cosolvent composition consisting mainly of esters, aromatics and ketones and therefore improves pot life. In all these case, drying remained fast, dry-through times of 15 minutes or less.

| | M1 | | M2 | | M3 | | M4 | | M5 | | M6 |
|---|---|---|---|---|---|---|---|---|---|---|---|
| TIME | Viscosity | TIME | Viscosity | TIME | Viscosity | TIME | Viscosity | TIME | Viscosity | TIME | Viscosity |
| 0 | 22 | 0 | 12.5 | 0 | 12.5 | 0 | 12.5 | 0 | 12.5 | 0 | 22 |
| 60 | 22 | 36 | 12.5 | 29 | 12.5 | 20 | 12.5 | 5 | 12.5 | 8 | 22 |
| 104 | 22 | 80 | 12.5 | 73 | 12.5 | 64 | 12.5 | 49 | 12.5 | 54 | 22 |
| 128 | 22 | 104 | 12.5 | 97 | 12.5 | 88 | 12.5 | 73 | 12.5 | 78 | 22 |
| 255 | 22 | 231 | 12.5 | 224 | 12.5 | 215 | 12.5 | 200 | 12.5 | 205 | 22 |
| 400 | 22 | 376 | 12.5 | 369 | 12.5 | 360 | 12.5 | 345 | 22 | 350 | 22 |
| 1459 | 22 | 1435 | 12.5 | 1428 | 12.5 | 1419 | 12.5 | 1404 | 800 | 1409 | 22 |
| 1868 | 22 | 1844 | 12.5 | 1837 | 12.5 | 1828 | 12.5 | | | 1818 | 22 |
| 2855 | 22 | 2831 | 12.5 | 2824 | 12.5 | 2815 | 22 | | | 2805 | 22 |
| 3271 | 22 | 3247 | 12.5 | 3240 | 12.5 | 3231 | 32 | | | 3221 | 22 |
| 4514 | 22 | 4490 | 12.5 | 4483 | 12.5 | 4474 | 50 | | | 4464 | 22 |
| 7905 | 27 | 7881 | 12.5 | 7874 | 12.5 | 7865 | 355 | | | 7855 | 22 |

EXAMPLE 27

In another set of experiments, we compared different types of alcohols with respect to their impact on pot life. A starting formulation was prepared with the following composition, and catalyzed with blocked base at a level of 0.04 meq/g solids:

| | |
|---|---|
| Example A-7 | 25.00 |
| TMPTA | 8.12 |
| Example B-4 | 9.79 |
| Catalyst C-17 | 1.81 |

This paint was reduced with various solvents to a 62% SC, to have the following overall solvent compositions (amounts in wt % on total composition):

| | Description | water | DMC | MAK | BG | MPK | BuAc | DEG-BE | p-amyl alcohol | diacetone alcohol | n-butanol | eth-anol | meth-anol | MIBK | 2-propanol | n-propanol |
|---|---|---|---|---|---|---|---|---|---|---|---|---|---|---|---|---|
| N1 | MPK | 1.1 | 0.85 | 6.50 | | 25.3 | 4.76 | | | | | | | | 0.08 | |
| N2 | Tecsol A | 1.1 | 0.85 | 6.48 | | | 4.75 | | | | | 21.9 | 1.1 | 0.2 | 2.438 | |
| N3 | Isopropanol | 1.1 | 0.85 | 6.50 | | | 4.76 | | | | | | | | 25.4 | |
| N4 | Diethylene Glycol Butyl Ether | 1.1 | 0.85 | 6.50 | | | 4.76 | 25.3 | | | | | | | 0.08 | |
| N5 | n-Butanol | 1.1 | 0.85 | 6.50 | | | 4.76 | | | | 25.3 | | | | 0.08 | |
| N6 | p-Amyl Alcohol | 1.1 | 0.85 | 6.50 | | | 4.76 | | 25.3 | | | | | | 0.08 | |
| N7 | Diacetone alcohol | 1.1 | 0.85 | 6.50 | | | 4.76 | | | 25.3 | | | | | 0.08 | |
| N8 | Butyl Glycol | 1.1 | 0.85 | 6.50 | 25.3 | | 4.76 | | | | | | | | 0.08 | |
| N9 | n-propanol | 1.1 | 0.85 | 6.48 | | | 4.75 | | | | | | | | | 25.6 |

The viscosity development in a closed tube was determined, as is tabulated below (time in minutes, viscosity in centipoise). It can be seen that short chain primary alcohol cosolvents as Tecsol-A (main component ethanol), n-propanol, 1-butanol, amyl alcohol and butyl glycol are very effective in prolonging the pot life of this system, isopropanol being of lower effectivity, but still higher than methyl propyl ketone, diethylene glycol butyl ether and diacetone alcohol. In all cases, drying remained fast (maximum dry through times 37 minutes when applied at 50 mu dry film thickness, and cured at RT).

| | N1 | | N2 | | N3 | | N4 | | N5 |
|---|---|---|---|---|---|---|---|---|---|
| TIME | Viscosity | TIME | Viscosity | TIME | Viscosity | TIME | Viscosity | TIME | Viscosity |
| 0 | 27 | 0 | 27 | 0 | 41 | 0 | 152.5 | 0 | 41 |
| 49 | 27 | 37 | 27 | 123 | 41 | 89 | 165 | 17 | 50 |
| 146 | 41 | 134 | 27 | 169 | 41 | 134 | 182.5 | 122 | 50 |
| 192 | 41 | 179 | 27 | 233 | 41 | 198 | 182.5 | 186 | 50 |
| 256 | 41 | 243 | 27 | 284 | 50 | 250 | 182.5 | 238 | 57.5 |
| 307 | 75 | 295 | 27 | 337 | 50 | 310 | 200 | 290 | 57.5 |
| 360 | 75 | 348 | 27 | 367 | 50 | 333 | 200 | 318 | 57.5 |
| 390 | 85 | 378 | 27 | 421 | 65 | 386 | 220 | 373 | 65 |
| 444 | 92.5 | 432 | 41 | 1392 | 100 | 1358 | 340 | 1346 | 75 |
| 1415 | 800 | 1402 | 41 | 1544 | 112.5 | 1510 | 340 | 1507 | 75 |
| | | 1555 | 41 | 1665 | 112.5 | 1630 | 355 | 1628 | 75 |
| | | 1675 | 41 | 1901 | 125 | 1871 | 480 | 1860 | 75 |
| | | 1968 | 41 | 2822 | 182.5 | | | 2778 | 75 |
| | | 2886 | 41 | 2984 | 200 | | | 2883 | 85 |
| | | 3051 | 41 | 3218 | 200 | | | 3118 | 92.5 |
| | | 3286 | 41 | 4252 | 400 | | | 4149 | 100 |
| | | 4318 | 41 | | | | | 4490 | 112.5 |
| | | 4658 | 41 | | | | | 8630 | 125 |
| | | 8844 | 65 | | | | | 10310 | 140 |
| | | 10524 | 65 | | | | | 11570 | 145 |
| | | 11784 | 65 | | | | | | |

-continued

| TIME | N6 Viscosity | TIME | N7 Viscosity | TIME | N8 Viscosity | TIME | N9 Viscosity |
|---|---|---|---|---|---|---|---|
| 0 | 75 |  |  | 0 | 125 | 0 | 41 |
| 81 | 75 |  |  | 51 | 132.5 | 24 | 41 |
| 202 | 75 |  |  | 172 | 182.5 | 41 | 41 |
| 269 | 75 |  |  | 239 | 182.5 | 64 | 41 |
| 364 | 75 |  |  | 334 | 182.5 | 92 | 41 |
| 435 | 75 |  |  | 407 | 200 | 123 | 41 |
| 1351 | 75 |  |  | 1328 | 490 | 169 | 41 |
| 1517 | 85 |  |  | 1490 | 490 | 237 | 41 |
| 1752 | 92.5 |  |  | 1723 | 590 | 325 | 41 |
| 2783 | 100 |  |  |  |  | 378 | 41 |
| 3124 | 112.5 |  |  |  |  | 439 | 41 |
| 7285 | 132.5 |  |  |  |  | 1407 | 57.5 |
| 8965 | 165 |  |  |  |  |  |  |
| 10225 | 230 |  |  |  |  |  |  |

EXAMPLE 28

The pot life extending effect of these alcoholic cosolvents also works for acetoacetate-acrylate based compositions with the present catalyst system. This in illustrated with the data below. The system was catalyzed with 0.04 meq blocked base/g solids.

| | |
|---|---|
| Setalux 17-1450 | 22.00 |
| Setalux 26-3701 | 3.00 |
| TMPTA | 6.14 |
| Catalyst C-17 | 1.17 |

This mixture was reduced to a 55% sc with various cosolvents, to obtain the following cosolvent levels.

The pot life of these acetoacetate systems is much more critical than for the malonate systems. Still, it can be observed that primary alcohols as butyl glycol, but especially the use of Tecsol-A (ethanol being the major component) gives a significant retardation of viscosity build-up, even at levels as low as 5 wt % ethanol.

EXAMPLE 29

The impact of additional alcoholic cosolvents was also demonstrated when using a methanolic starting catalyst composition C-18. A starting formulation was prepared with the following composition, and catalyzed with blocked base at a level of 0.04 meq/g solids:

| | Description | water | DMC | MAK | BG | MPK | BuAc | Aromatic 100 | ethanol | methanol | MIBK | 2-propanol |
|---|---|---|---|---|---|---|---|---|---|---|---|---|
| P1 | Tecsol A | 0.71 | 0.56 | 18 |  |  |  |  | 22.12 | 1.10 | 0.23 | 2.32 |
| P2 | 50/50 Tecsol A/MPK | 0.71 | 0.56 | 18 |  | 13.2 |  |  | 11.06 | 0.55 | 0.11 | 0.80 |
| P3 | 25/75 Tecsol A/MPK | 0.71 | 0.56 | 18 |  | 19.3 |  |  | 5.53 | 0.28 | 0.06 | 0.58 |
| P4 | MPK | 0.71 | 0.56 | 18 |  | 25.7 |  |  |  |  |  | 0.05 |
| P5 | Butyl Glycol | 0.71 | 0.56 | 18 | 25.7 |  |  |  |  |  |  | 0.05 |
| P6 | n-Butyl Acetate | 0.71 | 0.56 | 18 |  |  | 25.7 |  |  |  |  | 0.05 |
| P7 | Aromatic 100 | 0.71 | 0.56 | 18 |  |  |  | 25.7 |  |  |  | 0.05 |

The viscosity (Visco) increase in time (T) in a closed tube was measured (time in minutes, viscosity in centipoises).

| T | P1 Visco | T | P2 Visco | T | P3 Visco | T | P4 Visco | T | P5 Visco | T | P6 Visco | T | P7 Visco |
|---|---|---|---|---|---|---|---|---|---|---|---|---|---|
| 0 | 85 | 0 | 57.5 | 0 | 57.5 | 0 | 65 | 0 | 165 | 0 | 75 | 0 | 112.5 |
| 60 | 85 | 51 | 57.5 | 44 | 57.5 | 36 | 100 | 26 | 182.5 | 17 | 75 | 8 | 112.5 |
| 87 | 85 | 78 | 57.5 | 71 | 57.5 | 63 | 495 | 53 | 200 | 45 | 152.5 | 35 | 132.5 |
| 114 | 85 | 105 | 65 | 98 | 65 | 90 | 800 | 79 | 200 | 71 | 630 | 64 | 225 |
| 148 | 85 | 139 | 65 | 132 | 75 |  |  | 113 | 262.5 |  |  | 95 | 500 |
| 180 | 85 | 171 | 75 | 164 | 132.5 |  |  | 145 | 262.5 |  |  | 119 | 800 |
| 244 | 92.5 | 235 | 85 | 227 | 340 |  |  | 208 | 490 |  |  |  |  |
| 286 | 100 | 277 | 100 | 270 | 800 |  |  | 222 | 495 |  |  |  |  |
| 332 | 112.5 | 323 | 152.5 |  |  |  |  | 251 | 590 |  |  |  |  |
| 394 | 132.5 | 385 | 237.5 |  |  |  |  |  |  |  |  |  |  |
| 446 | 140 | 437 | 490 |  |  |  |  |  |  |  |  |  |  |

|   |   |
|---|---|
| Example A-7 | 25.00 |
| TMPTA | 8.12 |
| Example B-4 | 9.79 |
| Catalyst C-18 | 2.9 |

The paint was reduced with various solvents to a solids content of 60%. Estimated cosolvent composition is given in the following table (wt % on total composition).

|   | Description | DMC | MAK | BG | MPK | BuAc | DEG-BE | p-amyl alcohol | diacetone alcohol | n-butanol | ethanol | methanol | MIBK | 2-propanol | NMP |
|---|---|---|---|---|---|---|---|---|---|---|---|---|---|---|---|
| K1 | Methyl propyl ketone | 2.3 | 6.3 |  | 25.11 | 4.6 |  |  |  |  |  | 1.72 |  |  |  |
| K2 | Tecsol A | 2.3 | 6.3 |  |  | 4.6 |  |  |  |  | 21.54 | 2.80 | 0.23 | 2.26 |  |
| K3 | Isopropanol | 2.3 | 6.3 |  |  | 4.6 |  |  |  |  |  | 1.72 |  | 25.1 |  |
| K4 | Diethylene Glycol Butyl Ether | 2.3 | 6.3 |  |  | 4.6 | 25.1 |  |  |  |  | 1.72 |  |  |  |
| K5 | n-Butanol | 2.3 | 6.3 |  |  | 4.6 |  |  |  | 25.11 |  | 1.72 |  |  |  |
| K6 | p-Amyl Alcohol | 2.3 | 6.3 |  |  | 4.6 |  | 25.11 |  |  |  | 1.72 |  |  |  |
| K7 | Diacetone alcohol | 2.3 | 6.3 |  |  | 4.6 |  |  | 25.11 |  |  | 1.72 |  |  |  |
| K8 | Butyl Glycol | 2.3 | 6.3 | 25 |  | 4.6 |  |  |  |  |  | 1.72 |  |  |  |
| K9 | NMP | 2.3 | 6.3 |  |  | 4.6 |  |  |  |  |  | 1.72 |  |  | 25.1 |
| K10 | MAK | 2.3 | 31.4 |  |  | 4.6 |  |  |  |  |  | 1.72 |  |  |  |

The viscosity development in a closed tube was followed, and is represented below (time in minutes, viscosity in centipoises). It can be seen that, the presence of additional primary alcohols as ethanol, n-butanol, n-amyl alcohol and butylglycol is clearly advantageous in reducing viscosity build-up relative to the use of other solvents, despite all formulations already having a level of 2 wt methanol inherited from the catalyst solution.

| TIME | K1 Viscosity | TIME | K2 Viscosity | TIME | K3 Viscosity | TIME | K4 Viscosity | TIME | K5 Viscosity |
|---|---|---|---|---|---|---|---|---|---|
| 0 | 22 | 0 | 22 | 0 | 32 | 0 | 92.5 | 0 | 41 |
| 53 | 22 | 43 | 22 | 34 | 32 | 20 | 92.5 | 70 | 41 |
| 118 | 22 | 108 | 22 | 100 | 32 | 85 | 100 | 143 | 41 |
| 190 | 22 | 180 | 22 | 172 | 32 | 157 | 100 | 198 | 41 |
| 246 | 22 | 237 | 22 | 228 | 41 | 217 | 100 | 257 | 41 |
| 309 | 22 | 300 | 27 | 288 | 50 | 277 | 112.5 | 324 | 41 |
| 375 | 27 | 366 | 27 | 354 | 50 | 343 | 112.5 | 393 | 41 |
| 445 | 27 | 435 | 27 | 423 | 50 | 421 | 112.5 | 1365 | 65 |
| 1417 | 57.5 | 1408 | 27 | 1395 | 132.5 | 1386 | 132.5 | 1561 | 65 |
| 1607 | 85 | 1598 | 27 | 1591 | 132.5 | 1575 | 152.5 | 1687 | 75 |
| 1732 | 85 | 1723 | 27 | 1715 | 152.5 | 1701 | 152.5 | 1821 | 75 |
| 1868 | 100 | 1859 | 27 | 1851 | 182.5 | 1837 | 152.5 | 2792 | 85 |
| 2841 | 275 | 2832 | 41 | 2824 | 330 | 2811 | 200 | 3005 | 85 |
| 3050 | 435 | 3042 | 41 | 3034 | 400 | 3020 | 200 |  |  |

| TIME | K6 Viscosity | TIME | K7 Viscosity | TIME | K8 Viscosity | TIME | K9 Viscosity | TIME | K10 Viscosity |
|---|---|---|---|---|---|---|---|---|---|
| 0 | 50 | 0 | 75 | 0 | 65 | 0 | 85 | 0 | 27 |
| 54 | 50 | 48 | 75 | 76 | 65 | 51 | 140 | 42 | 27 |
| 126 | 50 | 120 | 75 | 135 | 65 | 110 | 225 | 95 | 27 |
| 182 | 50 | 178 | 75 | 195 | 65 | 170 | 330 | 155 | 27 |
| 241 | 50 | 238 | 85 | 261 | 65 | 236 | 880 | 221 | 27 |
| 307 | 50 | 305 | 85 | 339 | 75 |  |  | 291 | 32 |
| 377 | 50 | 382 | 85 | 1305 | 85 |  |  | 1264 | 112.5 |
| 1351 | 85 | 1348 | 132.5 | 1496 | 85 |  |  | 1460 | 112.5 |
| 1547 | 85 | 1539 | 140 | 1625 | 92.5 |  |  | 1589 | 132.5 |
| 1673 | 85 | 1667 | 152.5 | 1755 | 92.5 |  |  | 1719 | 132.5 |
| 1807 | 85 | 1799 | 152.5 | 2731 | 112.5 |  |  | 2695 | 330 |
| 2782 | 112.5 | 2774 | 200 | 2940 | 112.5 |  |  | 2904 | 470 |
| 2991 | 112.5 | 2983 | 212.5 |  |  |  |  |  |  |

What is claimed is:

1. A crosslinkable polymer coating composition comprising at least one crosslinkable component crosslinkable with a base catalyst and a latent base crosslinking catalyst, which crosslinkable composition has a solids content of at least 55 wt % (dry weight after crosslinking relative to the total weight of the crosslinking composition) and wherein the latent base catalyst is a substituted carbonate salt according to formula 1

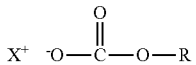

Formula 1 wherein X+ represents a non-acidic cation and wherein R is hydrogen, alkyl, aryl or aralkyl group and in which latent base catalyst, on drying, the carbonate salt decomposes releasing carbon-dioxide to produce a strong base catalysing crosslinking of the at least one crosslinkable components.

2. The crosslinkable composition according to claim 1 wherein the at least one crosslinkable component comprises reactive components A and B each comprising at least 2 reactive groups wherein the at least 2 reactive groups of component A are acidic protons (C—H) in activated methylene or methine groups and the at least 2 reactive groups of component B are activated unsaturated groups (C=C) to achieve crosslinking by Real Michael Addition (RMA) reaction upon deblocking of the latent base catalyst C by evaporation of carbon dioxide.

3. The crosslinkable composition according to claim 2, wherein the component A comprises one or more activated C—H groups having a structure according to formula 2:

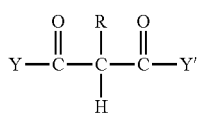

Formula 2 wherein R is hydrogen or an alkyl, aralkyl or aryl substituent and Y and Y' are same or different substituent groups or wherein at least one of the —C(=O)—Y and —C(=)—Y' is replaced by CN or phenyl.

4. The crosslinkable composition according to claim 3, wherein the activated C—H group in component A is a malonate (Y and Y' are —OR*), or acetoacetate (Y is —OR* and Y' is —R*).

5. The crosslinkable composition according to claim 2, wherein the component A is a compound comprising an average of 2 to 20 active C—H functions per molecule.

6. The crosslinkable composition according to claim 2, wherein the component B comprises an unsaturated acryloyl or maleate functional group.

7. The crosslinkable composition according to claim 2, wherein the ratio of the number of activated reactive acidic protons (C—H) in component A to the number of activated unsaturated groups (C=C) on component B is in the range between 10 and 0.1.

8. The crosslinkable composition according to claim 1, wherein the latent crosslinking catalyst is utilized in an amount ranging between 0.001 and 0.3 meq/g solids (meq/g solids defined as moles latent base relative to the total dry weight of the crosslinkable composition).

9. The crosslinkable composition according to claim 1, wherein the cation in the latent crosslinking catalyst is a quaternary ammonium or phosphonium carbonate salt according to formula 3,

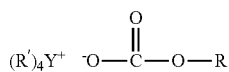

Formula 3 wherein Y represents N or P, and wherein each R' is a same or different alkyl, aryl or aralkyl group, R is hydrogen, alkyl, aryl or aralkyl group, wherein R and R' is optionally bridged to form a ring structure or wherein optionally at least one of R and R' is a polymer.

10. The crosslinkable composition according to claim 1, wherein the latent crosslinking catalyst is a substituted carbonate salt according to formula 4, wherein R" is hydrogen, alkyl-, aryl- or aralkyl group or an oligomer or polymer.

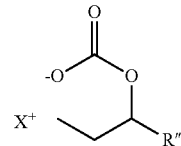

Formula 4

11. The crosslinkable composition according to claim 9 wherein the catalyst is obtainable by quaternising a polymer comprising a pending tertiary amine with a dialkylcarbonate to form a quaternary ammonium carbonate according to formula 3.

12. The crosslinkable composition according to claim 2, wherein component A comprises malonate and 0.1-10 wt % water (relative to total weight of the coating composition).

13. The crosslinkable composition according to claim 9, further comprising a compound RO—C(=O)O—R wherein R is the same as R in formula 3 but not hydrogen.

14. The crosslinkable composition according to claim 2, wherein the crosslinkable composition comprises, in addition to component A, a second component A2 comprising reactive acidic protons, wherein A2 has a higher acidity than component A and also is reactive towards component B with an RMA reaction.

15. The crosslinkable composition according to claim 14, wherein the pKa of component A2 is between 0.5 and 6 units lower than the pKa of component A.

16. The crosslinkable composition according to claim 14, wherein the amount of activated C-H in methine or methylene functional groups having the lower pKa (A2) is between 0.1 and 50 mole (of the total mole of activated C—H in methine or methylene functional groups).

17. The crosslinkable composition according to claim 14, wherein component A is a malonate containing component and component A2 is an acetoacetate or acetylacetone containing component.

18. The crosslinkable composition according to claim 1, comprising organic solvent wherein at least part of the solvent is an alcohol wherein the alcohol is present in an amount of at least 1 and at most 45wt % relative to the total weight of the crosslinkable composition and wherein the alcohol is a primary mono alcohol having 1 to 20 carbon atoms.

19. The crosslinkable composition according to claim 1, comprising the at least one crosslinkable component as a binder in a coating composition further comprising one or more coating additives.

20. The coating composition according to claim 19, having a solids content between 55 and 100 wt % diluent having a dry to touch time at room temperature between 5 to 120 min and a gel time of at least 3 hours at room temperature.

21. The crosslinkable composition according to claim 1, wherein the composition is combined with excess $CO_2$ to extend the potlife of the composition.

22. The coating composition according to claim 19, wherein the composition is combined with excess $CO_2$ to extend the potlife of the composition.

23. The crosslinkable composition according to claim 2, wherein the component A is a polymer compound comprising an average of 2 to 20 active C—H functions per molecule, wherein the polymer is a polyester, polyurethane, acrylic or polycarbonate or at least of a mixture and a hybrid of these.

24. The crosslinkable composition according to claim 14, wherein the crosslinkable composition comprises, in addition to component A, a second component A2 comprising reactive C—H acidic protons in activated methylene or methine groups, wherein A2 has a higher acidity than component A and also is reactive towards component B with an RMA reaction.

* * * * *